United States Patent
Davi

(10) Patent No.: US 11,219,933 B2
(45) Date of Patent: Jan. 11, 2022

(54) APPARATUS AND METHOD FOR SUPPORT AND CONTROLLED ADVANCEMENT OF A METAL SHEET IN A BENDING MACHINE FOR OBTAINING CYLINDRICAL OR TRUNCATED CONE STRUCTURES

(71) Applicant: PROMAU S.R.L., Cesena (IT)

(72) Inventor: Orazio Maria Davi, Cesena (IT)

(73) Assignee: Promau S.r.l.

( * ) Notice: Subject to any disclaimer, the term of this patent is extended or adjusted under 35 U.S.C. 154(b) by 67 days.

(21) Appl. No.: 16/762,348

(22) PCT Filed: Nov. 8, 2018

(86) PCT No.: PCT/IB2018/058776
§ 371 (c)(1),
(2) Date: May 7, 2020

(87) PCT Pub. No.: WO2019/092629
PCT Pub. Date: May 16, 2019

(65) Prior Publication Data
US 2020/0269302 A1  Aug. 27, 2020

(30) Foreign Application Priority Data

Nov. 10, 2017 (IT) .................... 102017000128723

(51) Int. Cl.
*B21D 5/12* (2006.01)
*B21D 5/14* (2006.01)
(Continued)

(52) U.S. Cl.
CPC ............ *B21D 5/004* (2013.01); *B21D 5/002* (2013.01); *B21D 5/006* (2013.01); *B21D 5/083* (2013.01);
(Continued)

(58) Field of Classification Search
CPC . B21D 5/12; B21D 5/14; B21D 43/02; B21D 43/09; B65G 7/04; B65G 7/08
(Continued)

(56) References Cited

U.S. PATENT DOCUMENTS

| 4,312,208 A | * | 1/1982 | Schafer | B21D 5/14 |
| | | | | 72/166 |
| 5,187,959 A | * | 2/1993 | Davi | B21D 5/14 |
| | | | | 72/10.6 |

(Continued)

FOREIGN PATENT DOCUMENTS

| DE | 2343674 A1 | 3/1975 |
| DE | 3615771 A1 | 11/1987 |

(Continued)

*Primary Examiner* — Douglas A Hess
(74) *Attorney, Agent, or Firm* — Laubscher & Laubscher, P.C.

(57) ABSTRACT

An apparatus for the support and the controlled advancement of a sheet in a bending machine for forming a cylindrical or conical structure, in particular of a truncated cone structure, comprises a base structural frame adapted to be positioned upstream of said bending machine, with respect to an advancement direction of the sheet, a plurality of conveying modules which can be mounted, removable, on the structural frame so as to generate a plan of modular support and advancement which can be configured geometrically according to the shape and dimensions of the sheet to be produced; the modular support and advancement plane is geometrically configured to keep the sheet metal part supported by the plane in a flat condition; an lifting and tilting device configured to vary the position of the structural frame, supporting the conveying modules, from a horizontal lying position to an inclined lying position in which the support and advancement plane is inclined downwards towards the bending machine; repositioning and position correcting members configured to orient and arrange the (Continued)

sheet in a correct position before starting a bending cycle and configured to correct, during the bending cycle, the position of the sheet to impose it a predetermined advancement trajectory towards and through the bending machine. The relative method is also envisaged.

27 Claims, 14 Drawing Sheets

(51) Int. Cl.

| | |
|---|---|
| *B21D 43/02* | (2006.01) |
| *B21D 43/09* | (2006.01) |
| *B65G 7/04* | (2006.01) |
| *B65G 7/08* | (2006.01) |
| *B21D 5/00* | (2006.01) |
| *B21D 5/08* | (2006.01) |
| *B65G 13/12* | (2006.01) |

(52) U.S. Cl.
CPC ................. *B21D 5/12* (2013.01); *B21D 5/14* (2013.01); *B21D 43/09* (2013.01); *B65G 7/04* (2013.01); *B65G 7/08* (2013.01); *B65G 13/12* (2013.01)

(58) Field of Classification Search
USPC ..................................... 72/127, 133; 198/373
See application file for complete search history.

(56) References Cited

U.S. PATENT DOCUMENTS

| | | | | |
|---|---|---|---|---|
| 5,218,850 A | * | 6/1993 | Davi | B21D 5/14 72/171 |
| 5,461,893 A | * | 10/1995 | Tyler | B21D 5/042 72/10.1 |
| 5,890,386 A | * | 4/1999 | Davi | B21D 5/14 72/13.4 |
| 5,946,961 A | | 9/1999 | Stone | |
| 6,044,675 A | * | 4/2000 | Davi | B21D 5/14 72/173 |
| 6,591,651 B2 | * | 7/2003 | Kutschker | B21D 17/04 72/10.1 |
| 7,325,427 B2 | * | 2/2008 | Ingvarsson | B21D 5/14 72/173 |
| 8,627,694 B2 | * | 1/2014 | Schreiber | B21D 51/2676 72/17.3 |
| 8,646,300 B2 | * | 2/2014 | Caporusso | B21D 7/08 72/173 |
| 8,899,086 B2 | * | 12/2014 | Boissin | B23K 11/063 72/166 |
| 8,919,162 B2 | * | 12/2014 | Moretto | B21B 37/68 72/8.3 |
| 9,452,464 B2 | * | 9/2016 | Roberts | B23K 31/00 |
| 9,468,961 B2 | * | 10/2016 | Davi | F15B 11/16 |
| 10,512,961 B2 | * | 12/2019 | Fabianek | B21D 5/00 |
| 10,646,909 B2 | * | 5/2020 | Fabianek | B21D 5/14 |
| 10,751,779 B2 | * | 8/2020 | Fabianek | B21D 5/004 |

FOREIGN PATENT DOCUMENTS

| | | |
|---|---|---|
| EP | 0100420 A1 | 2/1984 |
| EP | 0204290 A2 | 12/1986 |
| WO | 20088102388 A1 | 8/2008 |

* cited by examiner

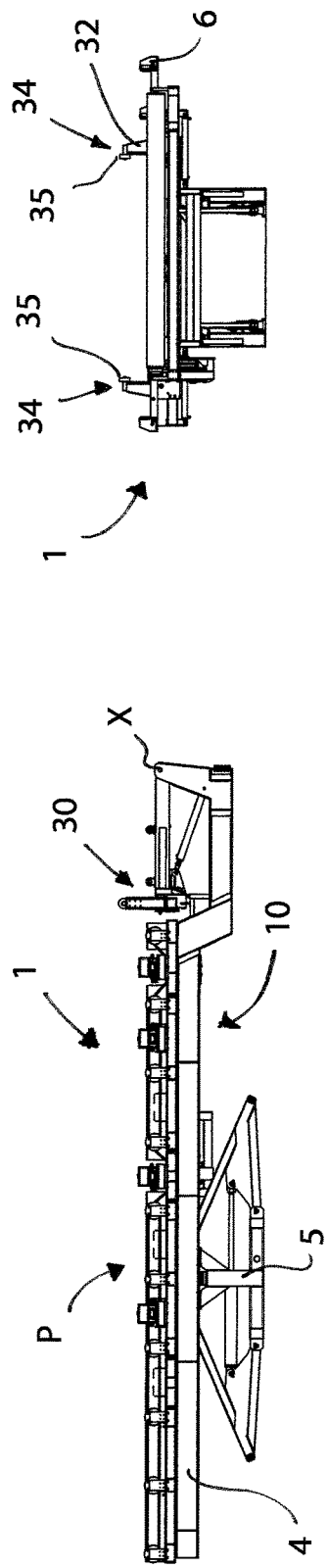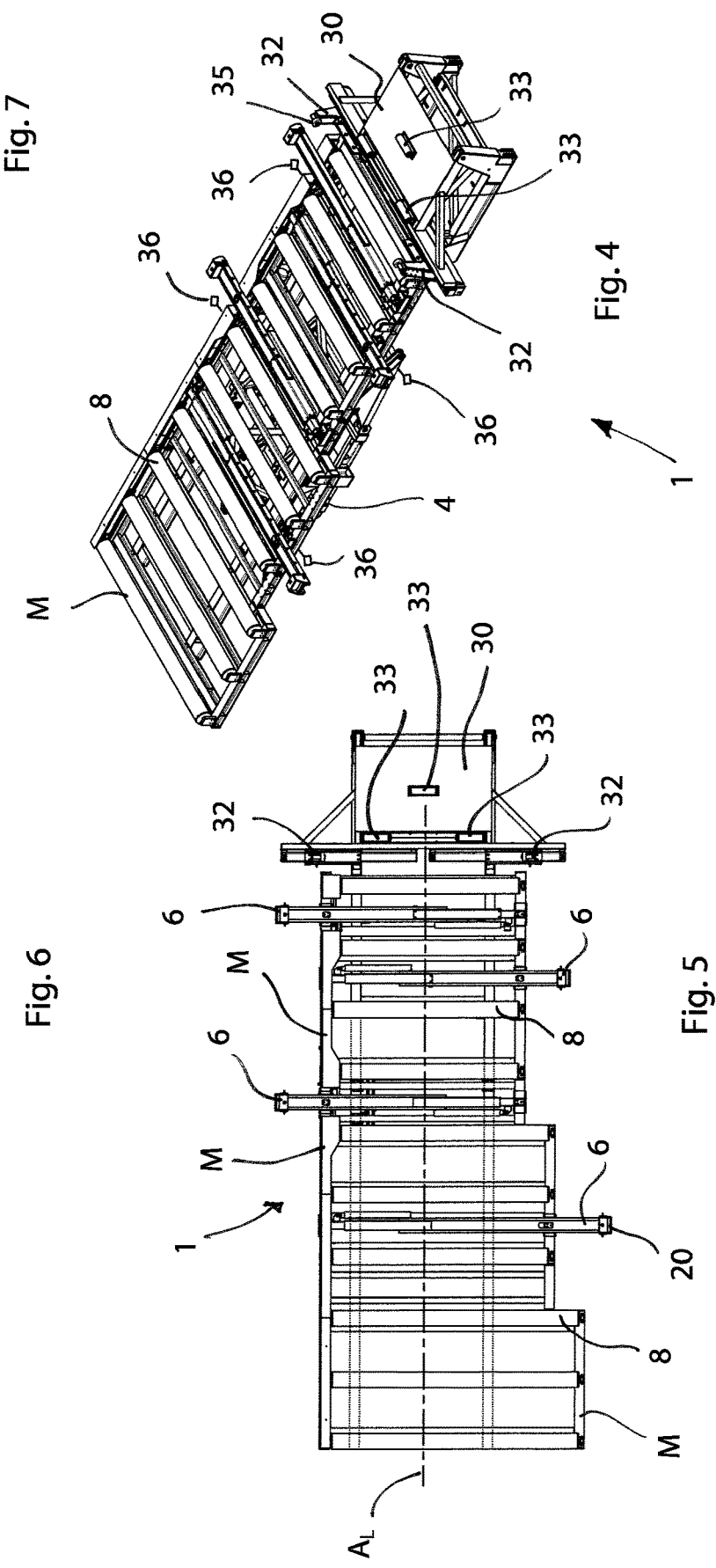

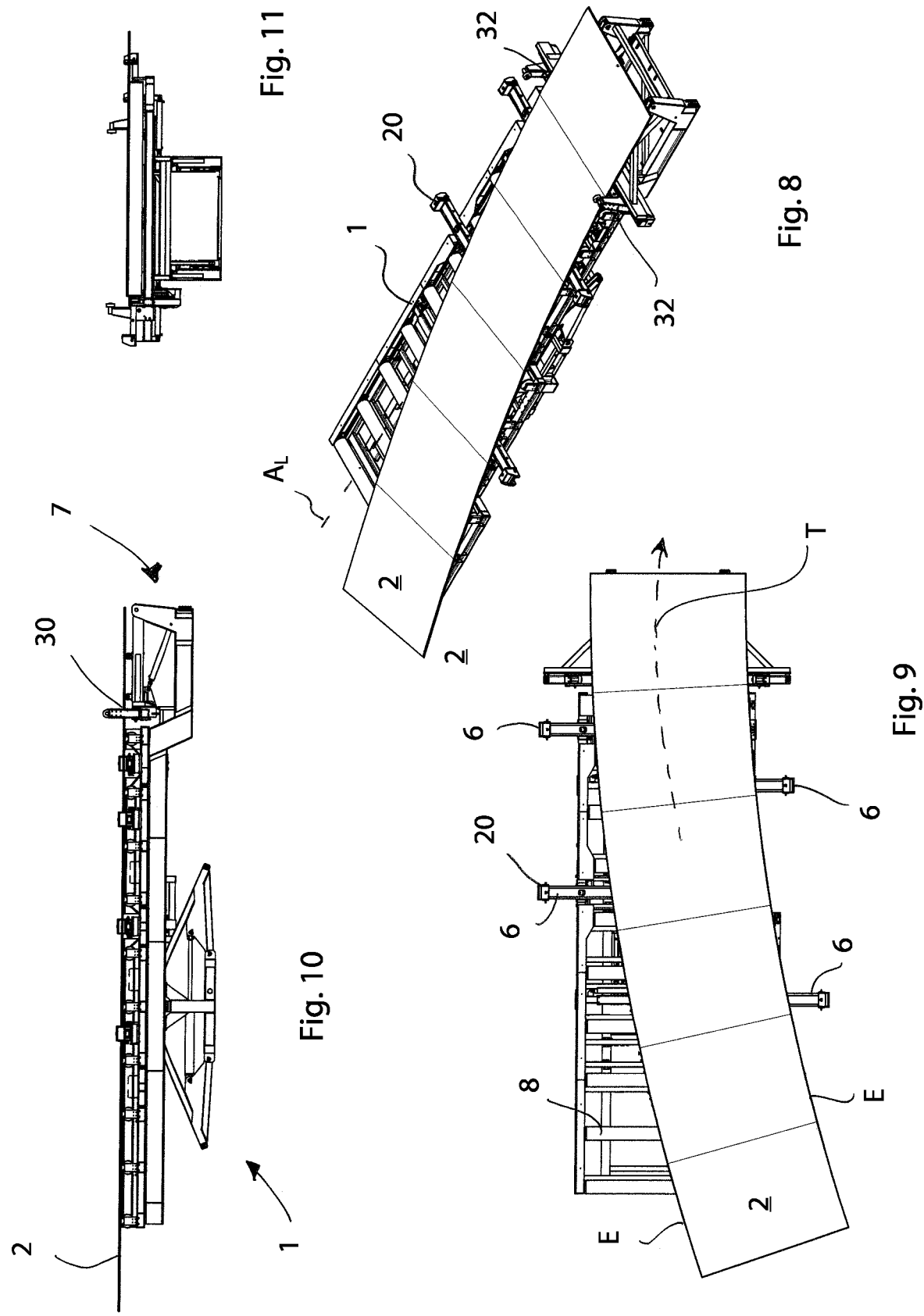

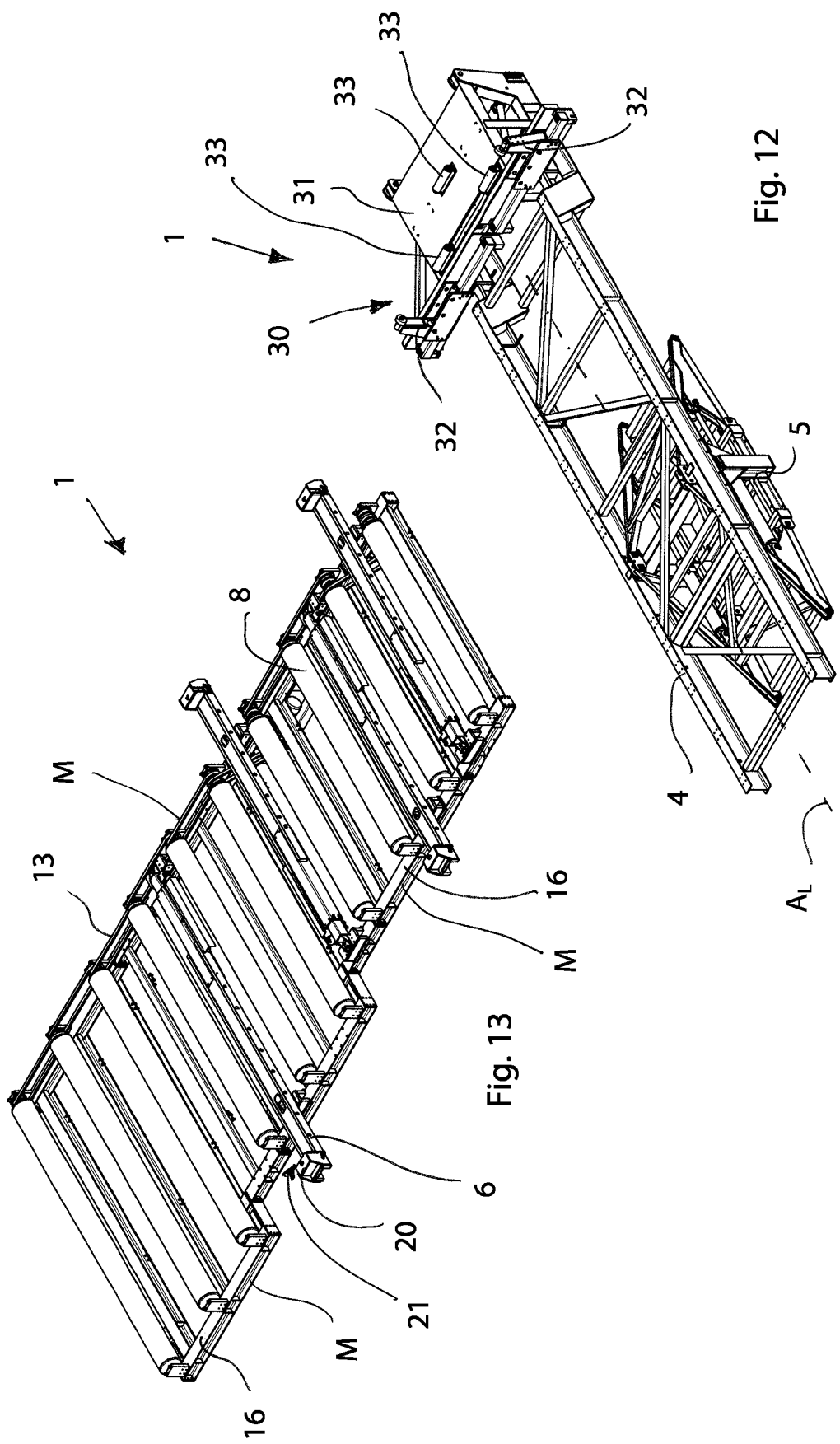

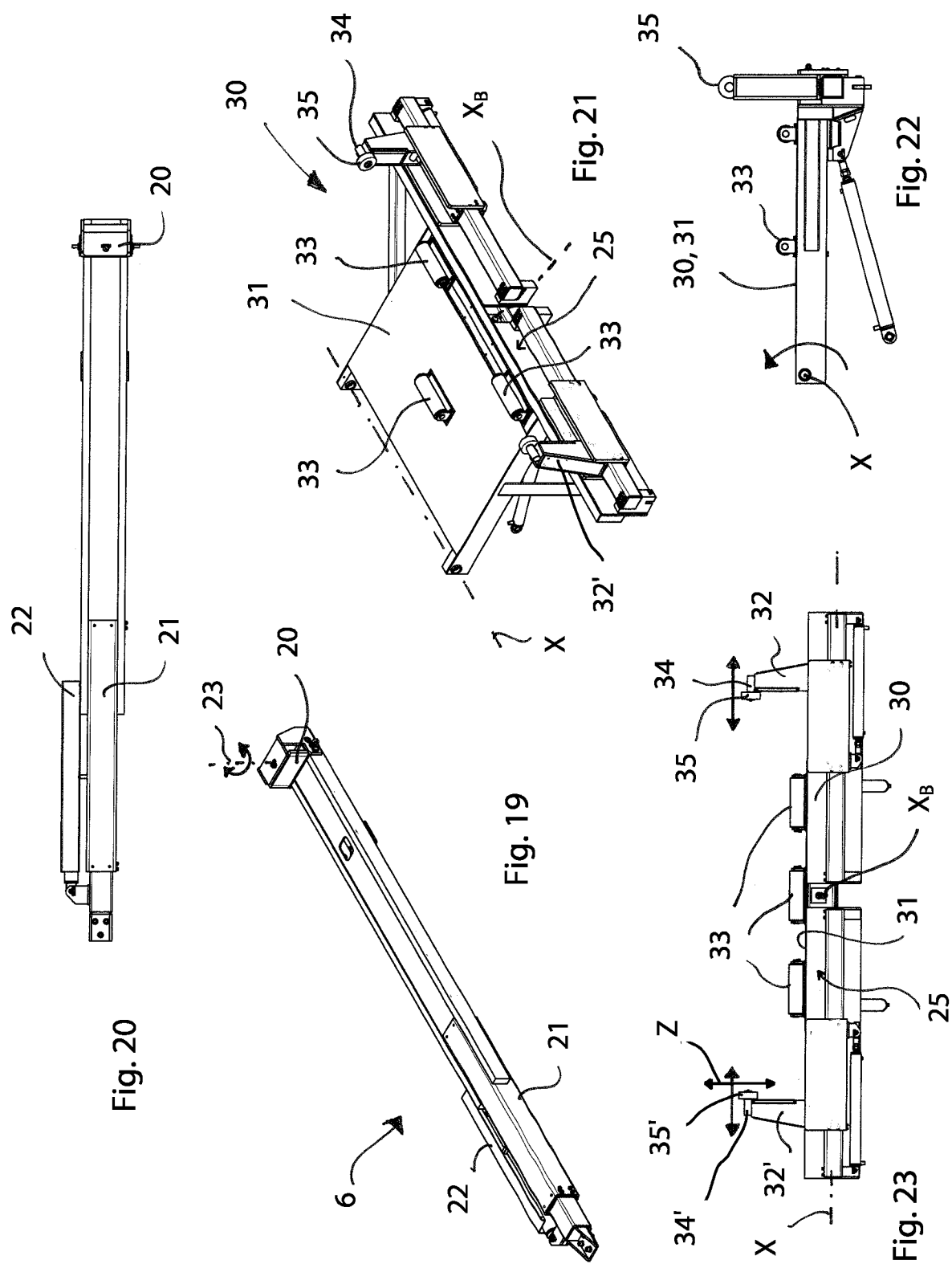

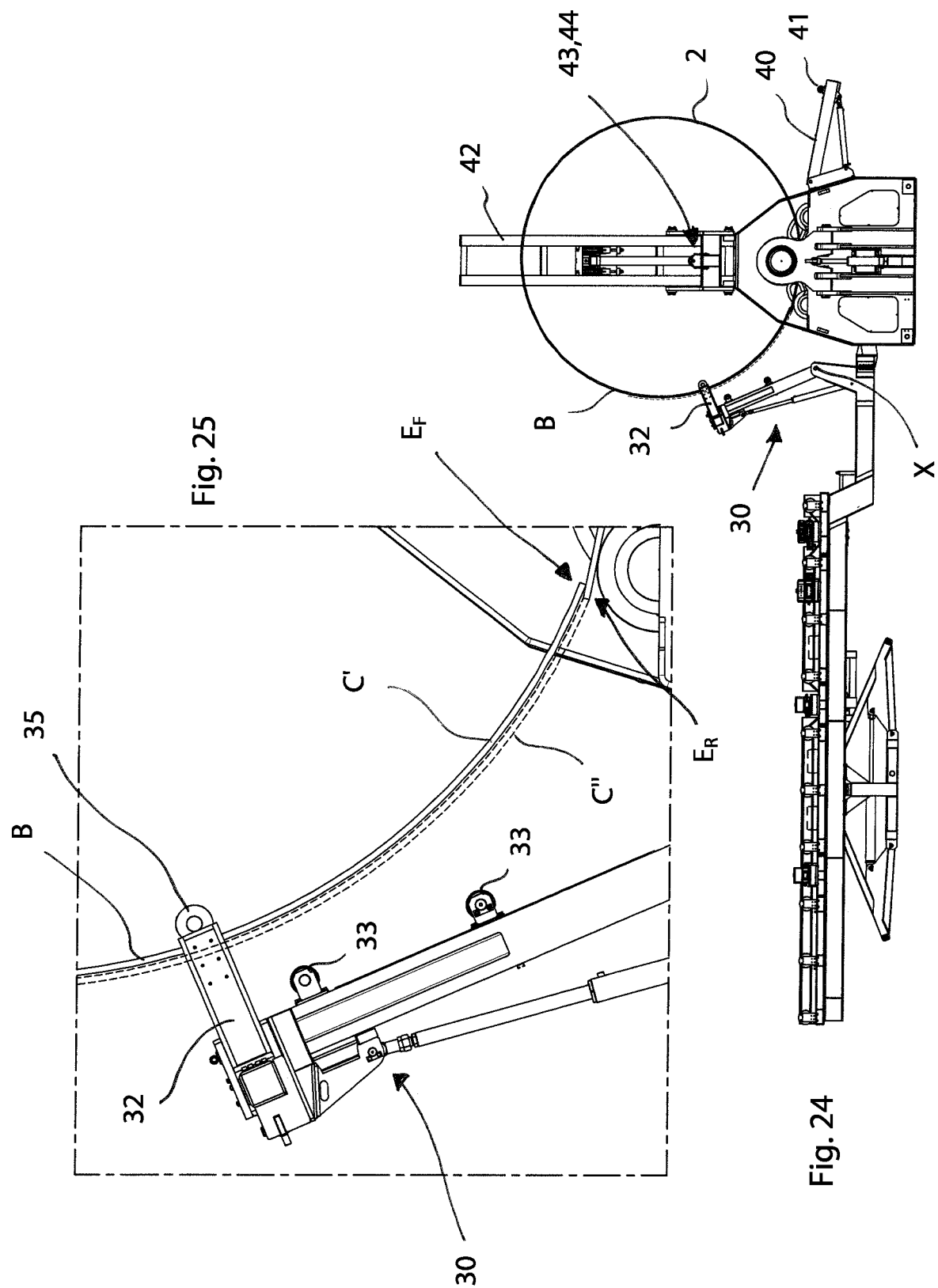

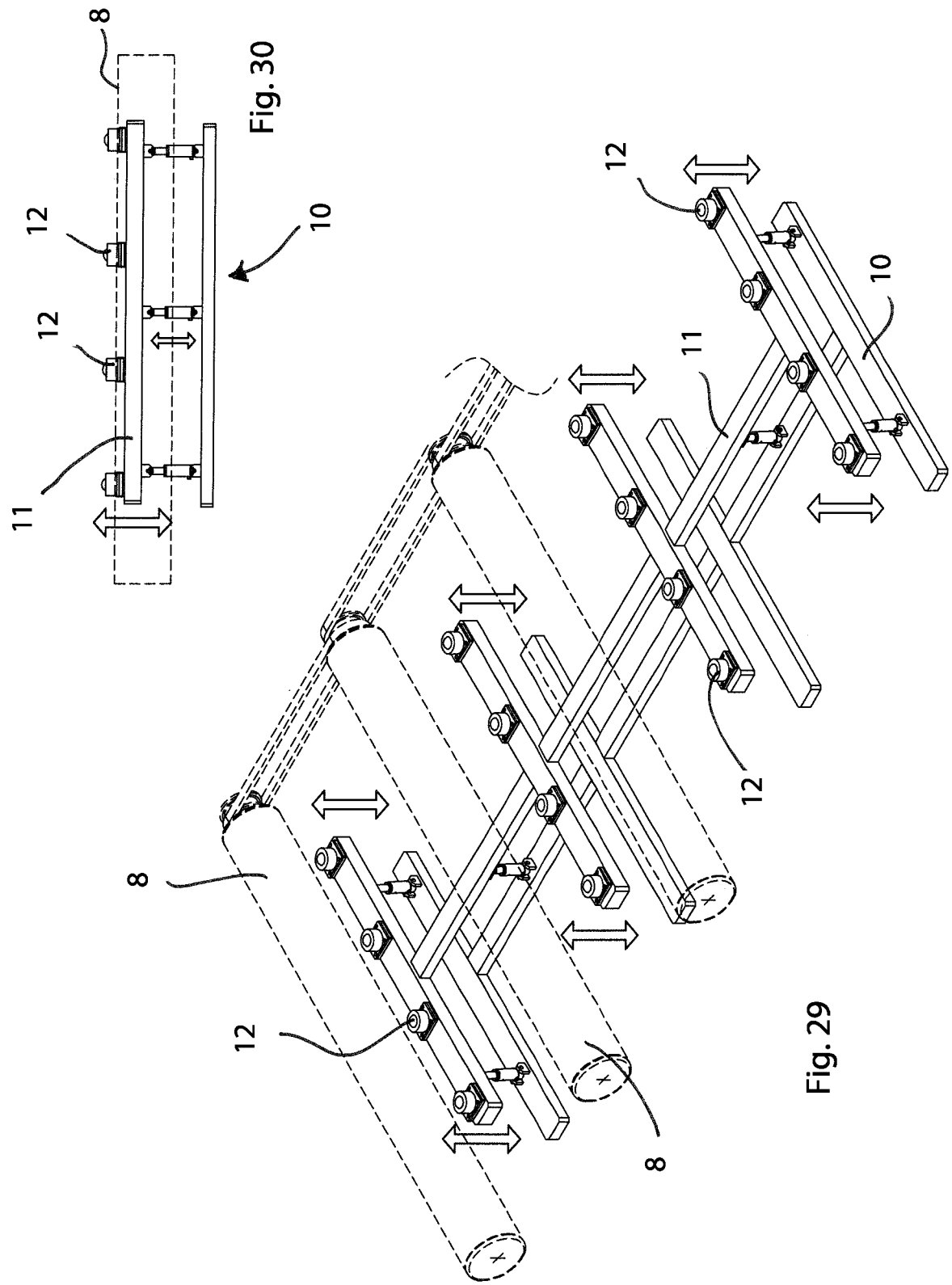

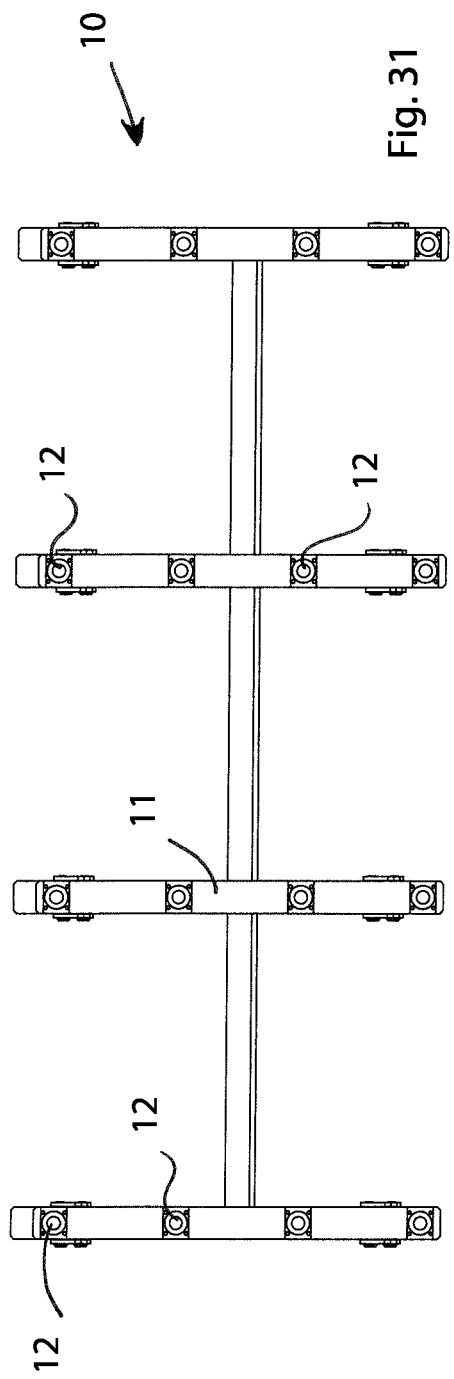
Fig. 31
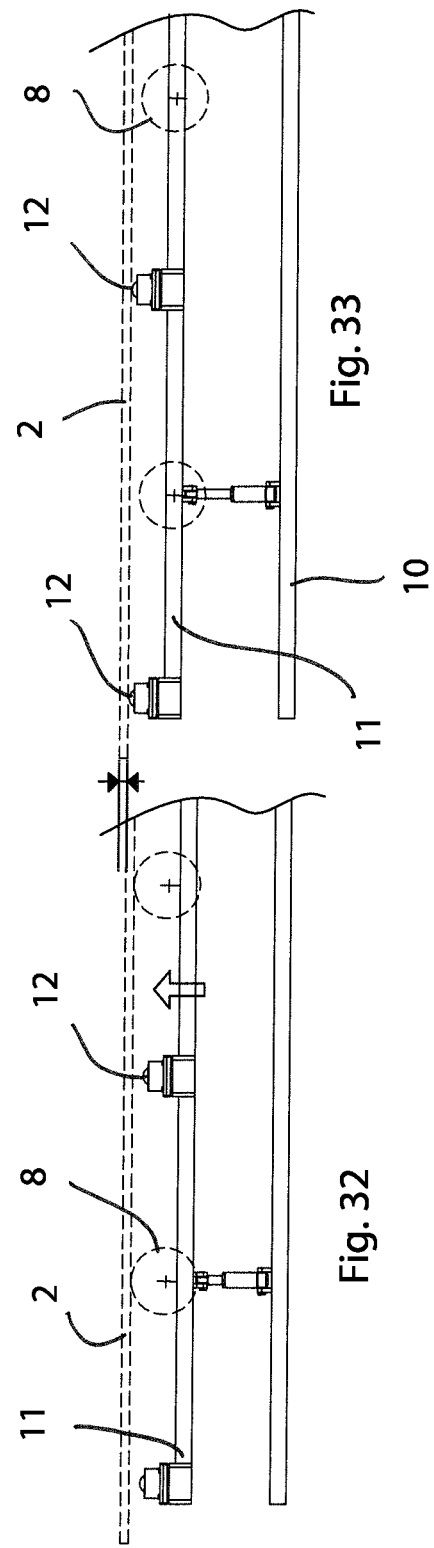
Fig. 33
Fig. 32

APPARATUS AND METHOD FOR SUPPORT AND CONTROLLED ADVANCEMENT OF A METAL SHEET IN A BENDING MACHINE FOR OBTAINING CYLINDRICAL OR TRUNCATED CONE STRUCTURES

This application claims priority of PCT/IB2018/058776 filed Nov. 8, 2018. PCT/IB2018/058776 claims priority of IT 10 2017000128723 filed Nov. 10, 2017. The entire content of these applications is incorporated herein by reference.

BACKGROUND OF THE INVENTION

The present invention relates to the field of machines or devices for the curvature such as in particular but in a not limitative way, bending machine of sheet as shown by way of example in the following description, and more particularly is directed to an apparatus and a method for supporting and advancing in a controlled manner a metal sheet through a bending machine to form cylindrical structures or truncated cone.

STATE OF THE ART

It is known the use of a roller bending machine adapted to bend a metal sheet to give it a cylindrical shape or a shape of a truncated cone.

Upstream of the bending machine is provided a resting plane on which is rested and then made to advance the sheet progressively toward and through the bending machine.

The resting plane, which may be defined by idle rollers, extends horizontally and is fixed in a stationary horizontal lying position.

The operation of bending of the metal sheet for obtaining a cylindrical shape is performed by the gripping of the metal sheet and the bending it, applied progressively along the whole longitudinal extension of the metal sheet and operated by rollers with parallel axes of the bending machine that impose on the sheet a cylindrical shape with constant diameter or even multi radius (consider for example the case of tanks for trailers: ellipticals or ovals or polycentrics) on the entire width thereof.

So that the bending process begins and concluded correctly, it is extremely important the initial position that the sheet must assume before starting the actual bending cycle.

It is therefore important the initial step of squaring with which the metal sheet is suitably positioned and oriented on the resting plane.

The metal sheet, which is dragged by the rotation of the rollers and advancing along a path perpendicular to the axes of the rollers is closed into the cylindrical shape required, which will have two circular bases with the same diameter and perimeters corresponding to the two equal lengths of the longitudinal edges of the initial sheet.

The closure in perfect cylindrical shape of the sheet metal can take place only by virtue of correct initial positioning, that is to say to a precise initial squaring of the metal sheet on the plane of the resting plane.

The squaring, according to the current state of the art, is not easy, is rather difficult and costly in terms of time.

For a small metal sheet may be sufficient the manual intervention of some operator to orient and causing the sheet to the bending machine.

For metal sheets with larger dimensions (different meters of length and important weight) overhead cranes are used which, by means of chains or bands and hooks, support the sheet metal in position, more or less horizontally, suspended in the air and the metal sheet is inserted between the rollers of the bending machine: this operation is affected by poor precision, as well as being very laborious and especially dangerous for the operators.

The difficulties and problems increase enormously in the bending processes for obtaining truncated cone structures, as will be described below.

It is known that for the embodiment of the truncated cone structures (or simply "conical structures", or more briefly "cones" as conventionally called in the sector), a sheet having a particular embodiment is subjected to a bending operation.

Differently from the previous case in which one starts from a sheet of simple rectangular shape, the shape of the metal sheet destined to generate a truncated cone shaped sector has inner and outer longitudinal edges having a certain curvature.

The curved sides correspond to the two upper and lower bases (and therefore of different diameter) of the final truncated cone and the mutually inclined straight sides are destined to be joined together and mutually welded longitudinally so as to complete the truncated cone. Said metal sheet, which is the plan development of the aforesaid truncated cone, thus has the geometric shape of a circular crown portion.

The metal sheet is driven by the rotation of the rollers and, at the end of bending in the bending machine, is closed onto itself so as to assume the shape of the truncated cone desired.

Also in this case the sheet, having an arched shape must be initially subjected to a squaring on the resting plane in front of the bending machine, in such a way as to have the front linear edge parallel to the rollers of the bending machine.

So that the sheet can be bent correctly to the truncated cone shape, it is necessary that it travels along a predetermined trajectory with precision rotate around a determined center of rotation in such a way that the generatrices of the truncated cone (which are on the metal sheet mutually inclined, arranged in a radial pattern and whose extensions converge in this center of rotation) are located from time to time parallel to the longitudinal axes of the rollers of the bending machine, as occurs with the first generating line at the beginning of the cycle.

This is necessary because the development of small base of the truncated cone is shorter than the extension of the large base of such truncated cone. The sheet must then advance at two different speeds, that is to say more slowly at the shorter than the base of small diameter, and more quickly at the longer base of large diameter.

To impart the rotation of the advancing sheet metal currently a pin element or wheel is used on which rests the curved edge, concave, inside the advancing sheet metal.

The metal sheet, pulled by the action of the rollers of the bending machine, rests with its curved edge inside on said wheel element or pin, which acts as a fulcrum for the rotation of the same sheet metal.

The metal sheet, by rotating around the aforementioned fulcrum of rotation, unfortunately is also subjected to an undesired relative sliding, in the case of pin or rolling on the wheel with the resting plane. For the precision in the case of resting plane defined by idle rollers, occurs a sliding friction of the metal sheet in the component of movement parallel to the roller axes. Obviously, the relative sliding with the resting plane causes on the sheet surface damage in some cases unacceptable.

In addition, the pressure forces that the edge and the pin element or wheel exchange, being very localized, are considerable and this unfortunately can cause damage to the said edge and much higher the lower the thickness of the latter.

When the dimensions of the sheet metal begin to be important, the above drawbacks become rather serious and not be tolerable.

Moreover, in these systems, the sheet is not always adequately guided by said pin element or wheel with which occurs a frequent loss of contact which sends out of the trajectory the same sheet metal. In such circumstances, unfortunately, it is necessary to stop the bending cycle, disengage the sheet by the pinching rollers of the bending machine, and reposition it with the use of hooks, chains, and overhead crane and then start again the process: all this involves a certain difficulty and waste of time and above all takes place in conditions totally unsatisfactory in terms of safety of the operators located in the vicinity, due to the precariousness of the improvised solutions for correcting the position of the metal sheet.

The situation becomes even more critical since the edges of the sheet are even more delicate because caulked, as often occurs to allow the truncated cone structure obtained to be then welded with another truncated cone structure for the embodiment, for example of the wind tower or of its foundations.

It is necessary to take into account the following appearance. At present in the wind sector, with the constant increase in the power values required to wind installations of electric generation, are more and more frequently proposed also wind turbines with blades of increasingly larger. As a consequence, also the towers for supporting such turbines must be sized adequately to support in total safety the static and dynamic loads to which they are subjected during the working life of the installation.

A current trend in the construction of very high towers, is the use of truncated-cone sectors of very large diameters but with sheet thickness more reduced. These requirements make it even more difficult the bending of the metal sheet and for the need to comply with more narrow dimensional tolerances and because of the greater risk of damage, due to the effect of the greater concentrated pressures, the thin edges of the metal sheet, made even more delicate by the presence of profile caulked.

Other guide systems provide to impose the translation to the sheet metal, a suitable guide pad on which rests, and there slide relatively, the internal curved edge of the metal sheet. With this system it is achieved a more extensive area of contact between the pad and the sheet metal edge which is not enough to avoid the risk of damage, especially in large and thin sheet metal. Moreover, the relative sliding between the pad and the edge of the sheet metal makes difficult the process due to the sliding frictions type that occur and that once again irremediably damage the geometry of the caulked edge of the sheet metal.

Sometimes, in order to avoid damage to the caulked edge, it is preferable to avoid any its contact with pads or pins or wheels as described above, and opts for an operation mode that provides a discontinuous advancement, that is to say for successive steps.

The sheet metal advances by one step in a rectilinear manner, therefore without rotation, is stopped temporarily and disengaged from gripping of the bending machine, rotated by a certain angular amount by using the above mentioned improvised elements (chains, hooks, grippers connected to a jack or to a overhead crane), gripped again and sent in a rectilinear manner by another step, and so on. Of course, the frequent operations of application and removal of the lashing of the metal sheet make the process drastically long and tiring, therefore expensive, as well as risky from the point of view of safety. Finally, the quality of the final article obtained because of the non uniformity of the radii of curvature obtained, very often does not satisfy the size requirements.

A further drawback of the known systems is the fact that the bending process requires, in particular for sheets of large dimensions, two or more passages of the metal sheet through the bending machine, in the advancement direction and in the opposite direction, due to the impossibility of bent in a single pass all the regions of the sheet, namely the portion of front edge. Hazardous and difficult attempts to bend directly already at the beginning of the cycle the portion of front edge of a large sheet would lead to unwanted mechanical stresses and deformations to the sheet opposite to those provided in the bending, which would negatively influence the mechanical properties of the same sheet metal.

Current systems require often, especially for obtaining of the truncated cone structures of considerable diameters, a step of "gauging" (also known as "re-rolling") of the structure truncated cone obtained, in order to guarantee perfect circularity of the obtained shape.

In fact, an imprecision of shape of the truncated cone structure would be unacceptable for the difficulties induced to subsequent operations in particular the welding step above all of the truncated cone structures. It is therefore necessary to subject the truncated cone structure just curved in a more passages in the bending machine, to carry out a machining operation corrective said of "gauging" (also known in the field as "re-rolling") which consists in "tighten" initially even beyond the position of the rollers that corresponds to its final ideal theoretical diameter (therefore "yelding" slightly, making the structure oval) and then, to each subsequent pass, "releasing slightly" this "over bending" up to reach, pass after pass, and light release after release, the desired final diameter. All this clearly represents a factor highly penalizing the productivity.

A further limit of current systems is the poor versatility of the resting and advancement planes in adapting to different formats and geometries of sheet metal, and in that in the case of sheet metal of considerable dimensions it becomes necessary to adopt structures and resting planes very bulky, made in a single structure which extends with a considerable longitudinal length, difficult to handle.

Since today with transport devices not exceptional, can be transported structures having a width not exceeding the 2.5 mt., current roller planes are constructed without exceeding this overall width "out all" (in the contrary case it should be used devices for exceptional conveying with a drastic increase in time and costs of transport).

Such roller planes are composed of two lateral beams long not less than 12 meters (which may also be more than 20 mt) that are pivotally connected to the respective opposite ends of the rollers. For not to exceed the maximum total width of 2.5 mt the rollers for resting the metal sheets are generally not long more than 1.6 mt or at the most no exceed the length of about 1.8 mt.

It follows that with the metal sheet to be bent wide 3 or 4 mt only a central fraction of the bottom surface is laid to rest on the rollers which support and transport the sheet toward the bending machine, while remain cantilevered and devoid of resting action, the two lateral strips.

The problem is exacerbated when it is necessary to bend metal sheets shaped as circular crown portion to obtain truncated cone structures. In this case, the actual resting region on the idle rollers is further reduced and it is even more precarious and dangerous lift in air or move a this sheet due to the condition of asymmetric resting and the presence of a considerable portion of cantilevered sheet metal laterally projecting from the roller plane.

From U.S. Pat. No. 5,946,961 is knew an apparatus for bending a web material.

In the light of the above there are therefore currently considerable room for improvement in the systems for bending metal sheets for the production of cylindrical or truncated cone structures.

OBJECTS OF THE INVENTION

An object of the invention is to improve the present systems for bending metal sheets.

Another object is to provide a technical solution, which is extremely versatile and of the modular type, easily transportable and able to be adapted, in turn, to different formats and geometries of sheet metal, ensuring, whatever is the geometry and the format of the metal sheet, an effective action of support uniform over the entire area of the sheet metal.

Another object is to provide a technical solution which allows the speeding up of the bending cycle, reducing the production times and drastically reducing the dead times, with advantages particularly appreciable in the case of bending of the truncated cone structures also of considerable dimensions.

A further object is to provide a solution that avoids to subject to undesired and not necessary stresses the sheet metal to be machined and which also allows an improvement in the quality of the semifinished product obtained, eliminating risks of errors in the process and dimensional differences (e.g. differences in the diameter of the truncated cone or cylindrical structure) along the entire surface of the product.

Another object is to provide a solution that allows to facilitate the bending process and to implement the process in conditions of total safety and comfort for the operators involved in the process also reducing the number of operators required.

BRIEF DESCRIPTION OF THE INVENTION

In a first aspect of the invention an apparatus is provided for the support and the controlled advancement of a metal sheet in a bending machine for forming a cylindrical or conical structure, in particular a truncated cone structure, said apparatus comprising:
  a structural frame of base adapted to be arranged upstream of said bending machine, with respect to a direction of advancement of the sheet metal,
  a plurality of modules of conveying configured to be mounted removably on said structural frame so as to generate a modular plane of support and advancement that is configurable modular geometrically according to the shape and dimensions of the metal sheet to be processed,
  said modular support and advancement plane being geometrically configured to maintain in a flat condition the part of sheet metal supported thereby,
  a elevation and inclination device configured to vary the position of said structural frame supporting said plurality of modules of conveying, by a the horizontal lying position to an tilted lying position in which said support and advancement plane is inclined in a manner descending toward said bending machine, and maintains the sheet part supported by it in a flat condition;
  members for repositioning and position correcting configured to direct and arrange said sheet in a correct position before the start of a bending cycle and configured to correct during the bending cycle, the position of said metal sheet by repeated successive repositioning, so as to impose to the latter a predetermined path of advancement toward and through said bending machine and reposition the sheet several times during the cycle in order to keep correct the geometry.

In a second aspect of the invention there is provided a method for supporting and advancing in a controlled manner a sheet metal toward and through a bending machine for forming a cylindrical or conical structure, in particular of a truncated cone structure, comprising the steps of:
  providing a plurality of conveying modules so as to generate a support and advancement plane that are modular and adapted to the shape and dimensions of said metal sheet to be processed,
  laying on said support and advancement plane said metal sheet
  actuate repositioning and position correcting members agents on the edges of said sheet to orient and placing said metal sheet in a correct position before the start of a bending cycle,
  actuate a device for lifting and tilting for arranging said support and advancement plane in a lying position inclined descending toward said bending machine, while said metal sheet is held in a flat configuration,
  advancing of a section said metal sheet through said bending machine for bending a front portion of said metal sheet
  returning said support and advancement plane and therefore the part of sheet metal supported thereby in a horizontal lying position,
  restarting the advancement of said metal sheet through said bending machine and further actuating said repositioning and position correcting members to correct, during the bending cycle, the position of said sheet with a repeated repositioning in accordance to the correct geometry to be obtained, and to impose to said sheet a predetermined trajectory of advancement through said bending machine. Thanks to the invention the above mentioned drawbacks are overcome.

In particular, thanks to the structural conformation modular and assemblable of the base structural frame of modular base and of the modules for conveying of variable dimensions according to the requirements and overcome the limitations associated with roller resting planes of the state of the art that very often are constructed with widths of maximum size equal to 2.5 mt (for not to fall in expensive category of structures that require a conveying exceptional), but that in this manner they are not suitable for processing sheets of large format, in particular the circular crown metal sheets for the production of the truncated cone structures.

Otherwise, thanks to the invention, it is possible to "customize" the support plane by adapting it to the geometry of the metal sheet to be bent.

In substance, it is possible to arrange, on the base structural frame, modules M of conveying having longer rollers (well beyond the length of 2.5 mt, for example of 4 mt or more), and placed in a manner offset with respect to the median longitudinal axis of the base structural frame only in the area where actually it is necessary provide a larger resting amplitude, i.e. furthest from the bending machine, without having necessarily to provide long rollers also in the regions closest to the bending machine instead where this would be superfluous. In the regions closest to the bending machine may instead be provided conveying modules having rollers of a shorter length.

The sizes of the modules of conveying, measured along the longitudinal direction of the base structural frame can be maintained below the maximum length of 2.5 mt so as to allow easy transport (not of exceptional type). It is sufficient to load, for example on a TIR, the modules with its own rollers arranged in the longitudinal direction.

Another advantage of the modular structure is to be able to laterally displace the modules, "on the same axis" to the rollers near to the bending machine, and moved toward the outside that is always more, away from the bending machine, in order to be able also to correctly and safely support sheets very arched with circular crown portion shape.

This movement can be carried out both "for long periods", then moving the modules even in a "manual" manner, with the aid of lift trucks or overhead cranes, or "frequently", by mounting these modules on wheels or slides which can allow the lateral translation facilitated (if pulled by an external driven element such as for example a lift truck) or even "powered" autonomously.

Thanks to this configuration guarantees an effective, safe and constant resting action for any type of sheet metal while avoiding the problems and the costs associated to shipment and transport of exceptional type.

Thanks to the apparatus according to the invention a metal sheet constantly receives a resting action uniform and always flat, therefore in the absence of not due and ingiustificate deformations and stresses, differently from current systems with overhead cranes or the like.

The apparatus according to the invention acts to determine the correct position of correctly place the metal sheet with respect to the bending machine in a totally automatic way, taking into account of its geometry, by providing the transverse front edge of the sheet parallel to the axis of the bending rollers (indispensable condition to obtain a curvature geometrically correct), operation to date not obtainable in an automated manner but which is entrusted solely to experience of specialized operators.

Thanks to the apparatus according to the invention, the sheet is caused to advance and inserted automatically between the rollers of the bending machine is then supported in safety in an inclined position upwards, and perfectly planar configuration, in the bending step of the initial border front, is reported in horizontal position and advanced, thanks to the members of repositioning and position correcting, with repeated and successive repositioning in automatic way, that is to say with a succession of small rotations are designed to ensure a geometric shape compatible with that of the structure to be made.

BRIEF DESCRIPTION OF THE DRAWINGS

The invention can be more easily understood and implemented with reference to the attached drawings, which show an exemplifying and non-limitative embodiment thereof, in which:

FIGS. 4 to 7 are different views of the apparatus according to the invention;

FIGS. 8 to 11 are different views of the apparatus supporting a metal sheet to be processed;

FIG. 12 shows a base structural frame and an aligning device which are part of the device;

FIG. 13 shows conveying modules which form part of the apparatus and which are intended to be mounted on the base structural frame;

FIGS. 19 and 20 are respectively a perspective view and a top view of a member of repositioning and position correcting, in particular a pusher of the apparatus;

FIGS. 21 to 23 are three different views of an aligning device forming part of the apparatus according to the invention;

FIG. 24 shows the apparatus in another working configuration with the aligner device in a work position;

FIG. 25 is an enlarged detail of FIG. 24;

FIGS. 29 and 30 are two different views of a lifting group included in apparatus;

FIG. 31 is a top view of the said lifting group;

FIG. 32 schematically shows the lifting group in a retracted rest position in which it does not interact with a sheet resting on rollers of the conveying modules;

FIG. 33 schematically shows the lifting group in a protruding position of work in which supports and maintains the metal sheet detached by the rollers of the conveying modules;

DETAILED DESCRIPTION OF THE INVENTION

Figure 1:
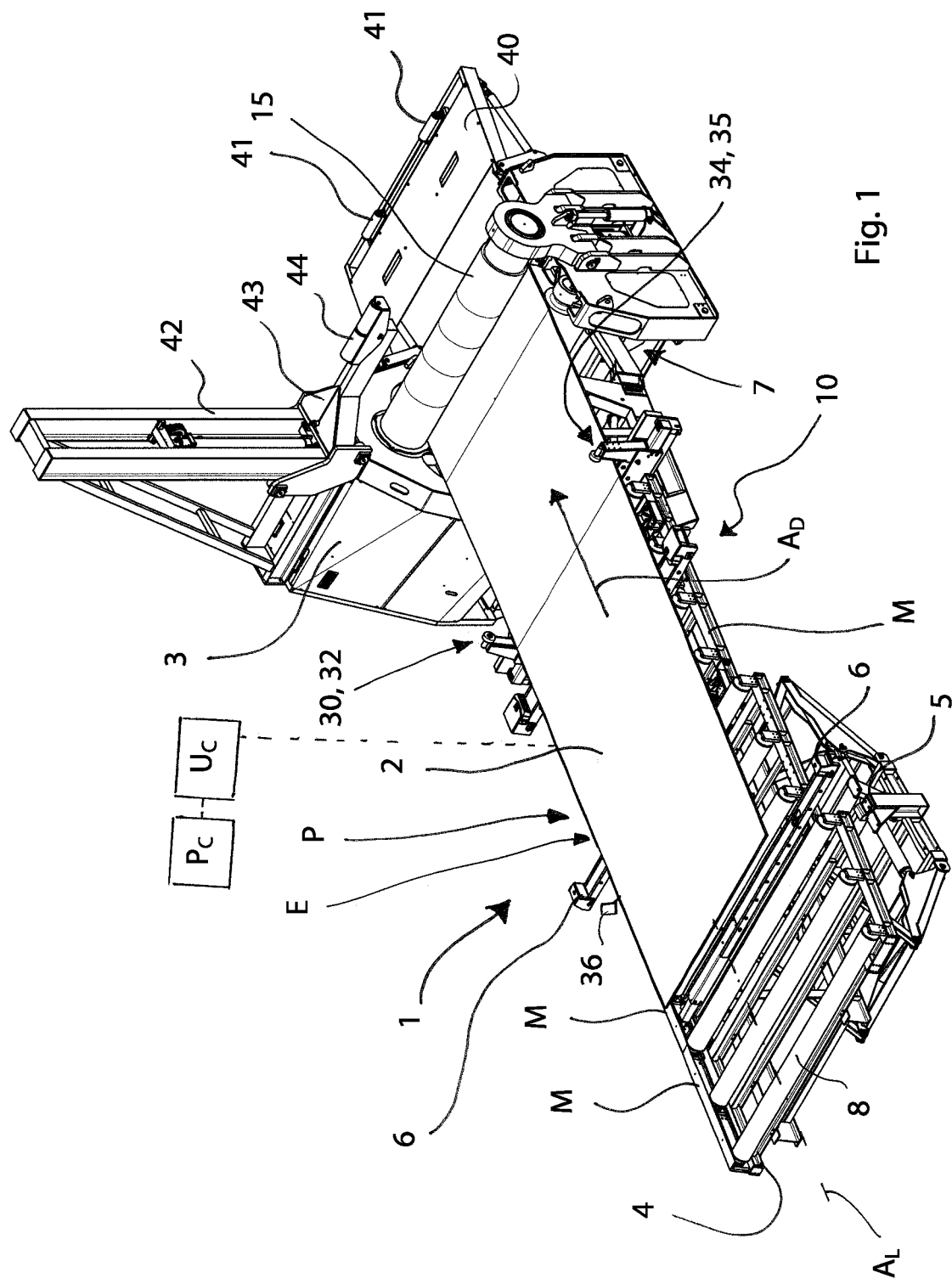
FIG. 1 shows the apparatus according to the invention combined with a bending machine.
Figure 2:
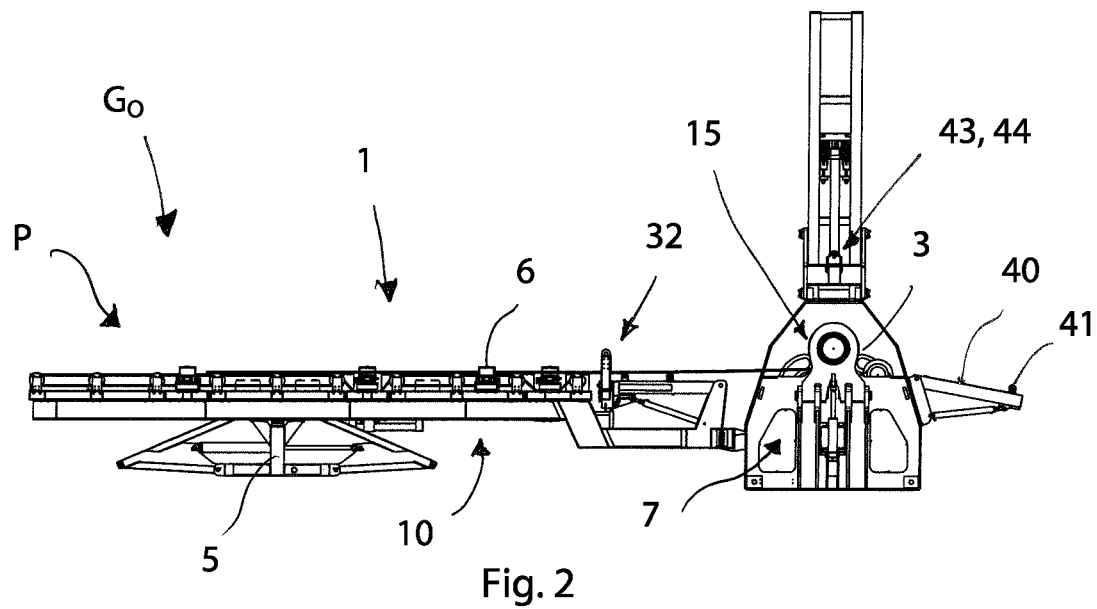
FIGS. 2 and 3 are two side views of the apparatus in two different operating configurations.

With reference to the attached Figures, there is shown an apparatus 1 according to the invention suitable to be mounted on a bending machine 3 of the type with three or four or more rollers for the processing of metallic products, in particular for bending metal sheets 2 and to obtain cylindrical structures or truncated cone structures or multi radial.

The apparatus 1 is used to support and advance in a controlled manner a metal sheet 2 and can also be connected to bending machines already existing, adapting itself with extreme ease to various configurations of machines that are already in use.

The apparatus 1 according to the invention comprises a base structural frame 4 able to be positioned upstream of the bending machine 3, with respect to an advancement direction $A_D$ of the sheet 2, and a plurality of conveying modules M configured to be removably mounted on the base structural frame 4 so as to generate a plane P of support and advancement modular, that is to say configurable geometrically according to the shape and dimensions of the metal sheet 2 to be processed.

As already mentioned, in conveying modules M can be moved laterally, that is to say in a transverse direction on the base structural frame 4 of structural base in such a manner that are "on the same axis" to the rollers near to the bending machine 3, is moved toward the outside that is always more, moving away from the bending machine 3, in order to be able to support correctly and safely also sheet very arched with circular crown portion shape.

This sideways displacement can be carried out either "for long periods", then moving the conveying modules M also in a "manual" manner, with the aid of lift trucks or overhead cranes, or "frequently", by mounting this conveying modules M on wheels or slides which can allow the lateral translation facilitated (if pulled by a driven element such as for example a lift truck) or even "powered" autonomously.

The structural base frame 4, which can be composed of two or more pieces that can be coupled, extends longitudinally with a total length $L_T$ which can be such as to be able to support and advance by the conveying modules M, sheets of considerable dimensions, e.g. long also about 20 meters or more. The width W of the base structural frame 4, measured transversely with respect to the direction of advancement $A_D$ of the metal sheet 2 is not greater than about 2.5 meters, so as to allow an easy transportability or displacement with normal devices without having to resort to systems of exceptional type transport.

Each conveying module M comprises a supporting frame 16 (e.g. FIG. 13) inside which are supported the opposite ends of a group of rollers 8.

The support frame 16 has in particular a quadrilateral shape with a size D1, in the longitudinal direction of the base structural frame 4, and another dimension D2 in the transverse direction with respect to the base structural frame 4.

Each module M may have three or four rollers 8 or other desired number suitable for the specific requirements.

The rollers 8 during operation are arranged so that their rotation axis transverse to the direction of advancement $A_D$ of the metal sheet 2. The groups of rollers 8 may be powered and driven in mutually synchronous manner.

In particular, there is an electric motor 9 (or even more than one according to requirements) which drives, by means of a transmission element 13 of the belt or chain type or equivalent elements, simultaneously all the rollers 8 of the plane P of supporting and advancing.

As mentioned above, and possible to diversify the dimensions of the various conveying modules M, for example by providing modules M more "narrow" in the vicinity of the bending machine 3, and modules M progressively more "wide" in the zones more upstream, that is more distant from the bending machine 3, and positioned in a manner offset with respect to the median longitudinal axis $A_L$ of the base structural frame 4, so as to efficiently support sheets 2 of arcuate shape also of considerable dimensions (sheets 2 very extensive and/shaped in the form of a portion of a circular crown with also accentuated opening angles of cone of the truncated cone structure to obtain), which would otherwise be arranged with a rear part not supported and laterally projecting in cantilevered position unstable and dangerous.

The rollers 8 belonging to the modules M more adjacent to the bending machine 3 can thus have a length D2' less than 2.5 meters, while the rollers 8 which are part of the modules M places more upstream may have a length D2" higher, even more than 4 meters, and the rollers 8 of the conveying modules M in an intermediate position can have a length D2'" included between said extreme values.

In substance, the dimension D2 of the modules M as measured orthogonally with respect to the advancement direction $A_D$ to or orthogonally to the longitudinal extension of the base structural frame 4, varies from a minimum value of about 2.5 mt or less (for modules M closer to the bending machine 3), to a maximum which can even exceed 4 mt (for modules M more upstream, farther away from the bending machine 3).

Thanks to this modularity and differentiation dimensional of the conveying modules M, it is possible to construct a support and advancement plane P adapted to measure to the shapes and sizes of sheets 2 from time to time processable.

The size D1 of each conveying module M, considered orthogonally with respect to the axes of the respective rollers 8 is about equal to or lower than the width W of said base structural frame 4, which is to say that does not exceed about 2.5 mt.

Thanks to these characteristics, geometrical and dimensional, the conveying modules M can be easily transported and in an independent manner and not rigidly coupled to the base structural frame 4. Also in the case in which the module M has a dimension D2 relevant, well greater than 2.5 mt, thanks to the fact that the dimension D1 is less than about 2.5 mt allows it to be loaded without difficulty on a TIR, or container or other, orienting the rollers 8 in the longitudinal direction of the loading compartment.

The apparatus 1 comprises a device 5 (or even more) of lifting and tilting configured to vary the position of the structural frame 4 supporting the conveying modules M, from a horizontal lying position $G_O$ to an inclined lying position $G_I$ in which the support and advancement plane P is inclined in a manner downwards toward the bending machine 3.

The possibility of inclining the whole plane P for supporting and advancing maintaining the sheet resting in perfect flat configuration allows to bend directly the head portion or front edge portion of the metal sheet 2 already at the first (and possibly single) passage through the bending machine 3, as will be better described hereinafter.

The device 5 of lifting and tilting is independent and disengaged from the bending machine 3 to prevent of transmitting them external loads, not direct and due to the curvature of the sheet. The device 5 of lifting and tilting is shaped so as to rest on the floor or on a foundation or independent frame, such as to allow a large lifting and tilting of plane P of support and advancement with motorized rollers.

Figure 17:
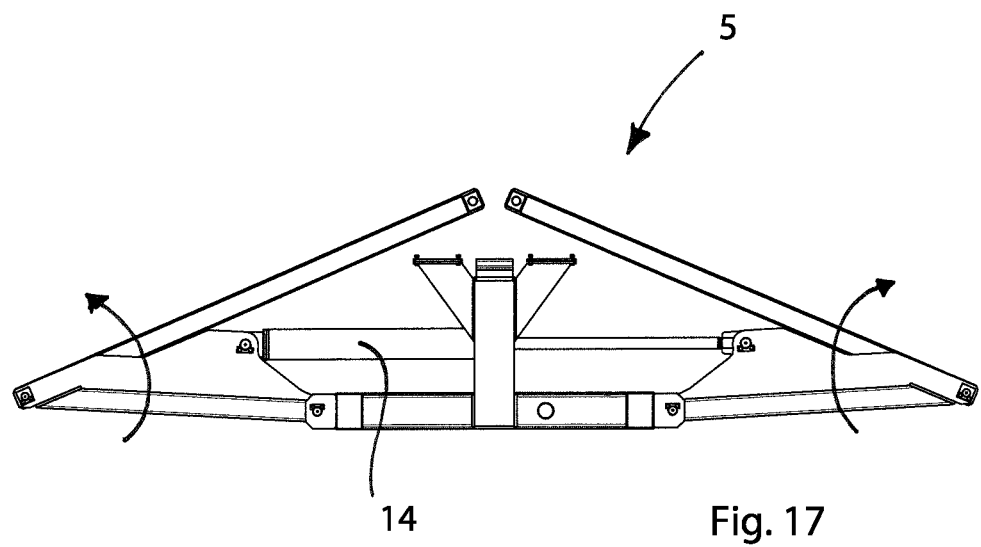
FIG. 17 shows a elevation device and inclination forming part of the apparatus according to the invention.
Figure 18:
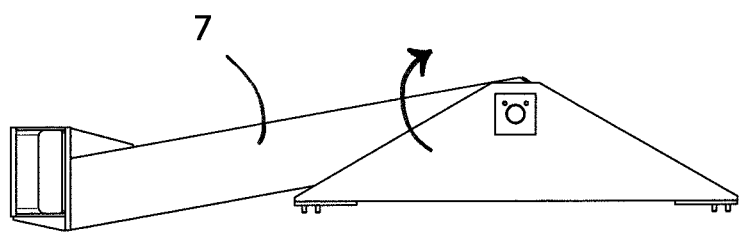
FIG. 18 shows a connection with hinge arms for the base structural frame.

According to a form of embodiment which is not limiting, the device 5 of lifting and tilting has a pantograph structure with bar elements mutually connected and articular and suitable drive actuators 14, as better visible in FIG. 17.

The pantograph shape of the device 5 of lifting and tilting makes possible to optimize the spaces under the base structural frame 4, and allows to avoid expensive and deep trenches which would be necessary for housing other types of lifting devices more bulky.

The base structural frame 4 comprises a front end which is suitable to be connected rotatably, by a connection with hinge arms 7 to a base of the bending machine 3, to a region located below or laterally to the rollers 15 of the bending machine 3.

The connection with hinge arms 7 acts as a fulcrum in such a way that to a lifting action on the part of the device 5 of lifting and tilting corresponds to a rotation of the structural frame 4; the connection with hinge arms 7 causes the lying plane taken from the plane P of support and advancement is maintained constantly tangential to the curve of deformation ideal assumed from sheet 2 at the clamping zone between the upper and lower pinching rollers 15 of the bending machine 3.

In other words, the roller support plane P is pivoted in a point of articulation "ideal" for its inclination, preferably located inside the volume occupied by the bending machine 3 below the pinching rollers 15, and in any case so that, when the sheet 2 is raised in a manner inclined upwards and supported to allow the curvature of its front edge (as described later), its lying plane remains tangent to the line of curvature imparted by the rollers of the bending machine.

The apparatus 1 comprises realignment members 6 devices, also called repositioning and position correcting members configured to direct and arrange in a correct position the sheet 2 before the start of a bending cycle. The members for repositioning and position correcting are especially configured to correct, during the bending cycle, the position of the metal sheet 2, by means of successive repeated repositioning, to make it a predetermined trajectory of advancement T toward and through the bending machine 3 and reposition it several times during the cycle in order to keep the correct geometry.

Each of repositioning and position correcting member comprises a pushing member 6 which has a resting head 20 configured to abut, and push the longitudinal edges E of said sheet 2. The pushing members 6 are mounted in such a way as to be able to act laterally on both sides of plane P of support and advancement. Two pushing members 6 are provided to one side and two further pushing members 6 to the opposite side of plane P of support and advancement. However it is possible to provide a different number of pushing members 6 on each side of the plane P of support and advancement, according to needs.

The resting head 20 is movable along a respective guide crosspiece 21 connected to the plane P of support and advancement transversely with respect to the direction of advancement. The pushing member 6 comprises a actuator member 22 arranged to move the resting head 20 along the respective guide crosspiece 21.

The actuator 22 can comprise an hydraulic double acting cylinder, fed by a suitable hydraulic circuit. Alternatively, the actuator 22 can be of the pneumatic or electric or of another equivalent type.

Each pushing member 6 is mounted with the crosspiece 21 of guide below the plane tangential to the rollers 8 along which lies the metal sheet 2 in such a way as not to interfere therewith; instead, the resting head 20 is connected to the crosspiece 21 of guide in cantilevered position upwards laterally with respect to the rollers 8, so as to be able to reach and push the longitudinal edges E of the sheet 2.

The resting head 20 (better shown in FIGS. 19 and 20) is connected by means of a pin to the support connected to the actuator 22 so as to be oscillating around a vertical axis 23. In this manner the resting head 20 has a certain rotational degree of freedom so as to be able to adapt, in self-aligning manner, to the position and inclination of the respective longitudinal edge E eventually curved of sheet 2.

To each pusher member 6 is operatively connected to a sensor 36 for detecting position and distance meter, or, for the sake of simplicity of illustration, distance measurement sensor, arranged to detect and monitor the position of each longitudinal edge E of the sheet metal 2 during the advancement.

It is also provided a Uc control unit, internally comprising a process logic module (PLC) having a suitably microprocessor programmed for activating and controlling several components of the apparatus 1. In the Uc control unit there is a software of numerical calculation and control of the inclination and positioning of the pusher members 6.

To the Uc control unit are operatively connected various components of the apparatus 1 and is configured and programmed to control the actuating of the conveying module M and for selectively activating and mutually independent pusher members 6 on the basis of the signals of the above distance measurer sensors 36, to correct the position and therefore the trajectory of advancement of the sheet 2.

The pusher members 6 being also managed completely automatically by the numeric control and software of the Uc control unit, the pusher members 6 are therefore of "intelligent" type.

The operation of the Uc control unit will be described in more detail below.

The apparatus 1 further comprises a lifting group 10 (best shown in FIGS. 29 to 33) configured to lift the metal sheet 2 of a small amount sufficient to keep it in a position detached from the plane P of modular support and advancement, so as to enable the pusher members 6 to correct the position of the metal sheet 2 off shifting it without relative sliding with the rollers 8 of plane P of support and advancement.

The lifting unit 10 is operatively connected to the Uc control unit which enables the operation of the lifting unit 10 in a coordinated manner to the actuation of the rollers 8 and the movement of pushing members 6.

The lifting unit 10 comprises one or more rack units 11, defined from bar elements on which are provided rolling elements 12 of the roller or ball type, intended to come into contact with and to lift, the lower surface of the metal sheet 2 facing downwards.

The rolling elements 12 which can be self aligning, roll under the sheet 2 to them superimposed, thus avoiding the sliding friction.

The rack unit 11 is movable from a lower level (retracted rest position), located below the plane defined by the upper conveying modules M (shown in FIG. 32), at a higher level (protruding position of work), situated above said plane (shown in FIG. 33), in which the metal sheet 2 is separated by the rollers 8 of the plane P of support and advancement.

The rack unit 11 is therefore of the disappearing type is in the lowered position of rest does not interfere with the sheet metal 2 moving forward.

The rack unit 11 can move vertically through an interspace defined between adjacent conveying modules M and between a roller 8 and another roller 8 of each conveying module M.

The rack unit 11 is able to be actuated by means of a suitable pneumatic or electric or hydraulic or another equivalent device.

By means of the lifting unit 10 it prevents the metal sheet 2 moved by the pushing members 6—in transversal direction with respect to the longitudinal axis of the structural frame 4 of the support plane P—flow with abrasive sliding along the rollers 8 and it is therefore avoided of damaging the lower surface of sheet 2.

Figure 27:
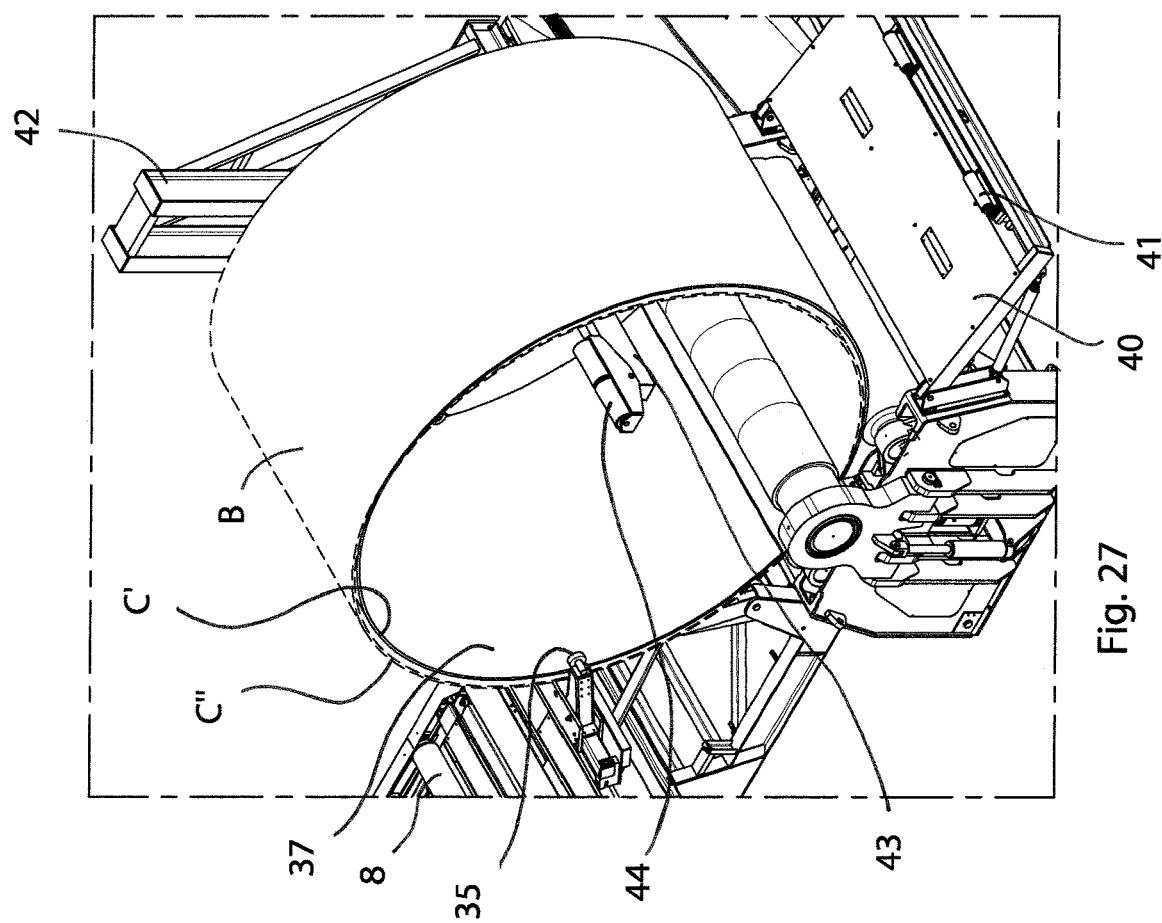
FIGS. 26 and 27 are two different interrupted perspective views which show the aligner device in the working position of FIG. 24.
Figure 26:
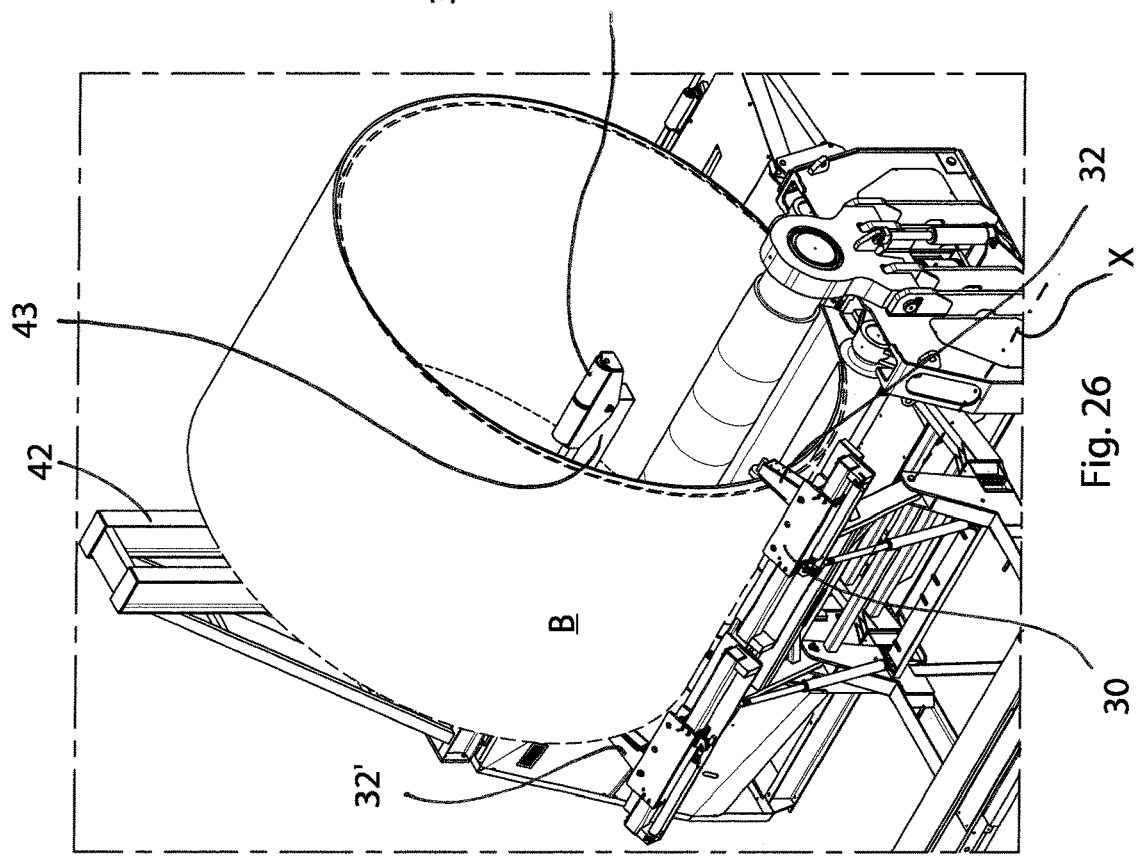
Figure 28:
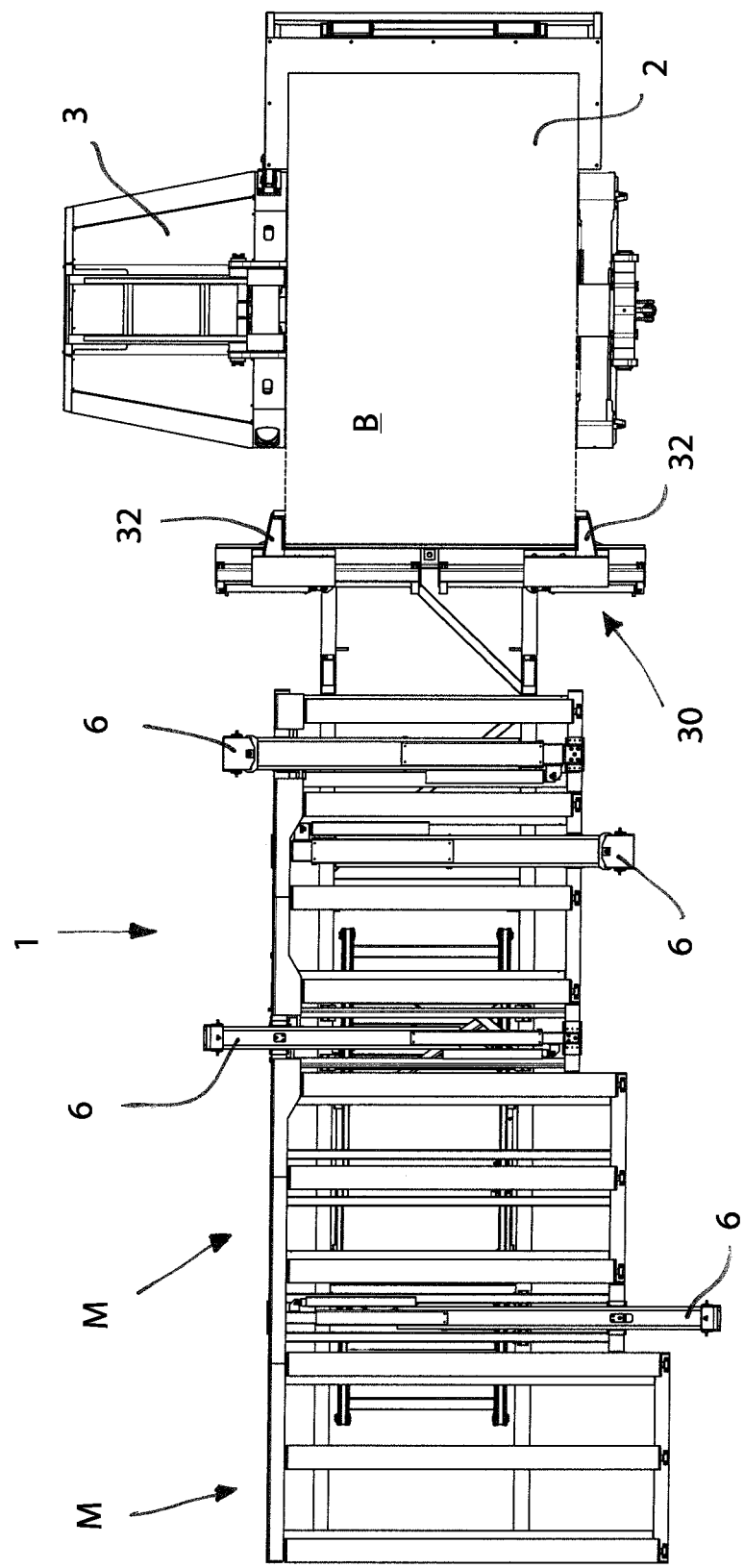
FIG. 28 is a top view of the apparatus in the operating configuration shown in FIG. 24.

The apparatus 1 further comprises a aligner device 30 adapted to be placed upstream of the bending machine 3, and configured to move a bent part B of sheet metal exiting to the bending machine 3 for correcting the curvature and to collimate a front edge $E_F$ of this bent part B which has already passed through the bending machine 3 to a rear edge $E_R$ of the sheet metal in imminent entry into the bending machine 3, as is better shown in FIGS. 26 and 27.

The aligner device 30 is conceived as part of the apparatus 1, therefore autonomous and independent from the structure of the bending machine 3, and thus is connected to the base structural frame 4.

However, in case of construction difficulties or logistic or for other needs, the aligner device 30 can be configured in such a manner as to be able to be connected directly to the bending machine 3, or connected to earth in a specific intermediate region between the base structural frame 4 and the bending machine 3. In the latter case the aligner device 30 is in any case operatively connected and operated in a coordinated manner to the remaining part of the apparatus 1.

The aligner device 30 comprises a tilting table support 31, the support 31 is rotatable around an horizontal rotation axis X that is orthogonal horizontal with respect to the longitudinal axis $A_L$ of the base structural frame 4 of base and is therefore, transversal to the direction of advancement $A_D$ of the metal sheet 2.

On the tilting table support 31 are mounted two repositioning lateral arms-pushers 32 that are movable independently the one from the other in a direction that is parallel to the aforesaid axis of rotation X to exert thrusts on the two opposite edges of bent part B of sheet metal for correcting a possible axially offset position.

The pusher arms 32, in addition to operating in alignment step of bent part B of sheet metal (therefore when the tilting table support 31 is rotated in a raised position with respect to the horizontal lying position) can cooperate with the other pushing members 6 of repositioning (therefore with the tilting table support 31 in the horizontal position) in initial squaring step of the metal sheet 2 and also in the following steps of repeated-positions for the correction of the trajectory of advancement of the sheet 2.

On the rotatable tilting table support 31 are mounted pusher rollers 33 suitable for press on the outer surface of the bent part B of sheet metal to push it in a direction that points toward the bending machine 3.

The pusher rollers 33 are supported in a tilting way by the aligner device 30, that is to say that they are mounted on a bar element 25 that can oscillate around an axis $X_B$ of oscillation which extends longitudinally with respect to the base structural frame 4. This makes the pusher rollers 33 self aligning, that is to say match the lie of the outer surface of bent part B of the sheet 2.

By repositioning lateral pusher arms 32 project internally and horizontally respective pin elements 34 on each of which is mounted a respective wheel element 35.

The pin elements 34 are movable integrally with the respective pusher arms 32 of repositioning in a parallel direction to the aforesaid axis of rotation X horizontal, from an external disengagement position with respect to the volume held by bent part B of sheet metal to an engaging position inside this volume. The wheel elements 35 are adapted to rest on the inner surface 37 of the bent part B of sheet metal.

At least one of lateral pusher arms 32, in particular the pusher arm 32' (FIGS. 21, 23, 26), intended to interact with the region with a larger diameter of the truncated cone structure, is also provided with a translational degree of freedom in the direction Z (FIG. 23) orthogonal with respect to the plane of the tilting table 31 of the aligner device 30; in other words, the pusher arm 32', and with it the respective pin element 34' and wheel element 35', can be moved along the direction Z orthogonally in moving towards/away from the plane defined by aligning device 30, for instance through a hydraulic cylinder or other suitable and equivalent operating element. Thanks to this configuration, it is possible misaligning the pusher area 32' with respect to the other pusher arm 32 closer to the tilting table 31 in order to allow the respective wheel element 35' can come in contact with the curved zone of sheet metal that since provided with a larger diameter, is closer to aligner device 30 with respect to the opposite zone of sheet metal having smaller diameter. In other words, while in the case of curvature of a cylindrical structure the two wheel elements 35 and 35' are positioned at a same distance from the plane of the tilting table 31 and thus lie on a plane which is parallel to the axes of the rollers of a bending machine, in the case of a truncated cone structure (which therefore would have opposite areas of edge at a different distance from the aligner device 30), thanks to the adjustment in the direction Z orthogonal to the tilting table 31, it is possible to adjust the pusher arm 32' so that the two wheel elements 35, 35' are on a suitably inclined plane and parallel to the directrix of the truncated cone structure on which it is necessary to perform the aligner device 30 in order to restore the perfect circularity and position of bent part B of sheet metal.

The pusher arms 32, thanks to the aforesaid translational degree of freedom in direction Z adapt effectively to the truncated cone shape of bent part B of sheet metal. The pushing to and/or reverse pulling action of bent part B of metal sheet with respect to the bending machine 3, and also the transverse displacement of the front edge $E_F$ and its alignment to the rear edge $E_R$ are improved. The precise alignment of the front edge $E_F$ with the rear edge $E_R$ allows a welding to the rules of the art, which causes the two bases of the truncated cone lie on two planes regular, in the absence of undesired stepped zones that would otherwise be generered by an imperfect transverse alignment of the said two head edges of the sheet.

During operation, at a rotation of the tilting table support 31 moving away from bending machine 3, that is to say at a rotation which tends to bring the tilting table support 31 toward its the horizontal lying position, achieves a pressure action of the two wheel elements 35 on the inner surface 37 (with the pin elements 34 in engagement position). The aforesaid action of pressure is such to pull back the bent part B of the sheet metal.

Therefore, with the wheel elements 35 which can push in a rearward direction with the pusher rollers 33 that can push in the front direction, and with the two pusher arms 32 of repositioning (which support the wheel elements 35) that can push transversely from opposite directions toward the inside of the apparatus 1, it is possible to apply to the bent part B of the sheet any desired movement intended to give the correct shape and position.

The action of pull of the bent sheet serves to avoid its natural tendency to collapse by gravity through its own weight or intervenes for slightly "re-open" the bent sheet eventually already partially collapsed.

The aligner device 30 avoiding a superposition of front and rear areas of sheet metal (phenomenon of "overlapping" dangerous if in input between the rollers 15 of the bending machine 3), and acts to correctly align the front edge $E_F$ to the rear edge $E_R$ of the bent sheet metal.

According to a further possible embodiment implementation is provided that the pusher arms 32 are supported in such a way as to be also oscillating around the axis $X_B$ of oscillation described above.

The pusher arms 32 and said pusher rollers 33 can then be mounted on the same shared bar, or on different bars, so as in any case to be tilting around the aforesaid axis $X_B$ of oscillation.

Also in this case, thanks to this possibility of a tilting movement around the aforesaid axis $X_B$ of oscillation, the aligner device 30 is able to rest adapting to effectively bent part B of sheet metal, constantly maintaining both pusher rollers 33 in contact with the metal plate. The pusher arms 32, thanks to the aforesaid degree of freedom in oscillation, are also self aligning, and adapt effectively to the truncated cone shape of bent portion B of sheet metal. Also in this version, is improved the pushing to and/or inverse pulling of bent part B of metal sheet with respect to the bending machine 3, and also the transverse displacement of the front edge $E_F$ and its alignment to the rear edge $E_R$. The results already mentioned above are thus achieved, that is to say a precise alignment of the front edge $E_F$ with the rear edge $E_R$ which allows a welding geometrically precise and free of imperfections and undesired stepped zones.

In the FIGS. 25, 26 and 27 is shown by way of example the operation of the aligner device 30 which acts to bring the bent part B of sheet metal of a wrong configuration C" of shape and position, to a correct configuration C" of shape and position.

The aligner device 30 can also be combined with an optical monitoring device such as a television camera, useful to the operator for perfectly displaying the current position of two edges $E_F$, $E_R$, and control more easily the device 30 also remotely, in conditions of total safety, shielded from dangerous work areas.

Thanks to the intervention of the aligner device 30 possible for an operator to perform more easily the spot welding, with short welding beads ("tack welding") to stiffen the structure before the extraction from the bending machine 3.

Also the aligner device 30 can be controlled by the Uc control unit and is moved in a synchronized manner with the rollers of the bending machine 3 and/or with the conveying modules M and with the lifting and tilting device 5.

Further distance measurement sensors associated to the aligner device 30 may be provided and arranged to detect the position of the edges of bent part B of sheet metal; in this case the Uc control unit is configured and programmed for activating and controlling the aligner device 30 on the basis of the signals supplied by said additional sensors.

The apparatus 1 further comprises a control panel Pc with a graphical interface for the programming of the Uc control unit and for the input of dimensional and geometric data relative to the sheet 2 and/or to the conical or cylindrical or truncated cone structure to obtain by means of the bending process of the metal sheet 2.

Is now described the operation of the apparatus 1 according to the invention.

An operator types on the graphic interface of the control panel of Pc the geometric/dimensional data of the truncated cone structure to produce (or of the metal sheet 2 to be bent to generate this truncated cone structure).

The software calculates the geometry of the plane development of the truncated cone structure, that is to say determines the geometry of the starting flat sheet metal 2, and determines as such sheet 2 should be placed on the plane P of roller support so that it has its front edge $E_F$ ("inlet") perfectly parallel to the axis of the rollers 15 of the bending machine 3.

The control unit Uc then calculates the positions in which the pushing members 6 must be arranged to impose to sheet 2 the starting position and orientation above indicated.

The control unit Uc, once calculated the required starting position of the metal sheet 2, commands the pusher members 6 to move with their resting heads 20 in position as far as possible from the plane P of support, making it completely free the resting surface so as not to hinder the operations of transfer and laying of a sheet 2 on the plane P of support and advancement.

In this way, a metal sheet 2 can be laid easily and with more quickly on the plane P of support, without however having to worry about its correct orientation, the latter being achieved automatically by the apparatus 1.

Once the metal sheet 2 is laid in fully random position on the plane P of support, the step of automatic alignment, or squaring, of the front edge $E_F$ of sheet 2 to the rollers 15 of the bending machine 3 at the beginning of the cycle occurs.

The control unit Uc (where required to avoid scratches or other damages to the surface of the sheet metal) can control the lifting of the lifting group 10 that therefore detaches the sheet 2 by the rollers 8 of the surface P of support in order to avoid slippage with friction in the subsequent squaring operation of sheet 2.

To a start command imparted by the operator by means of the control panel Pc, the control unit Uc automatically activates the pushing members 6 currently in the parking position and total disengagement by controlling them to move toward the sheet metal 2 until they reach the position each associated to the correct arrangement of the metal sheet and hence corresponds to have its leading edge perfectly parallel to the axis of the rollers of the bending machine 3.

The pushing members 6 then enter in contact with the edge/s E of the sheet 2 and the move until it is taken to the ideal position with the front edge $E_F$ perfectly parallel to the axis of the rollers 15 of the bending machine 3.

At this point the lifting unit 10, if lifted above, is lowered, and activated the conveying modules M, the front edge $E_F$ of the sheet metal 2 is advanced to be inserted and clamped between the rollers 15 of the bending machine 3.

Once gripped the front edge $E_{F1}$, and initiated rising of the front roller of the bending machine (the immediately in front of the apparatus 1 to roller conveyor) which begins to lift and folding the metal sheet to bending it, is also activated the lifting and tilting device 5 which transfers the sheet 2 from the horizontal lying position $G_O$ to the inclined lying position $G_I$. In particular, the lifting and tilting device 5 is preferably synchronized lifting and tilting and is actuated simultaneously with the upward movement of the front roller of the bending machine.

The lifting of the support plane P is accompanied also by a raising of the tilted table support 31 which is then moved synchronously to the plane P of support, in elevation and in lowering. The sheet 2 is then made to advance by a portion through the bending machine 3, thus be bent immediately the front portion of the sheet 2.

Subsequently, the front roller of the bending machine 3 (the immediately in front of the apparatus 1 to roller conveyor), after be risen to fold the front edge of the sheet metal, begins to fall, to bring the part of the metal sheet still upstream, not bent in the horizontal lying position while in the manner synchronized, is also lowered the support plane 4 toward the horizontal lying position $G_O$ so as to keep the metal sheet always in a perfect resting on the whole of its length; can thus begin advancing in automatic mode "semi-continuous" of the sheet 2 through the bending machine 3.

The sheet 2 is made to advance, linearly, of a advancement distance calculated by the numeric control and then be rotated slightly, and so on.

After having restored the support and advancement plane P and therefore the part of sheet 2 supported thereby horizontal lying position $G_O$ and before starting again the advancement of the sheet metal 2, is raised a rear roller 27

Figure 3:
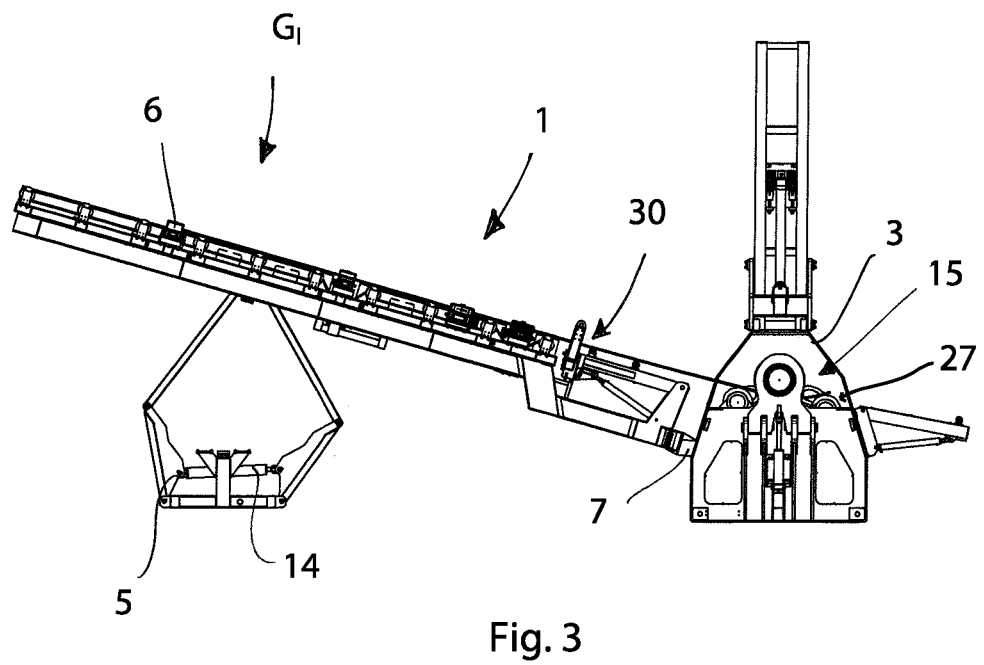
Figure 16:
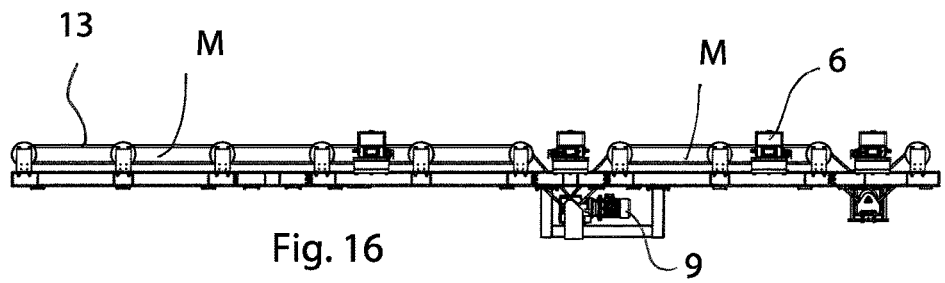
FIGS. 15 and 16 are respectively a top view and a side view of the conveying modules.
Figure 15:
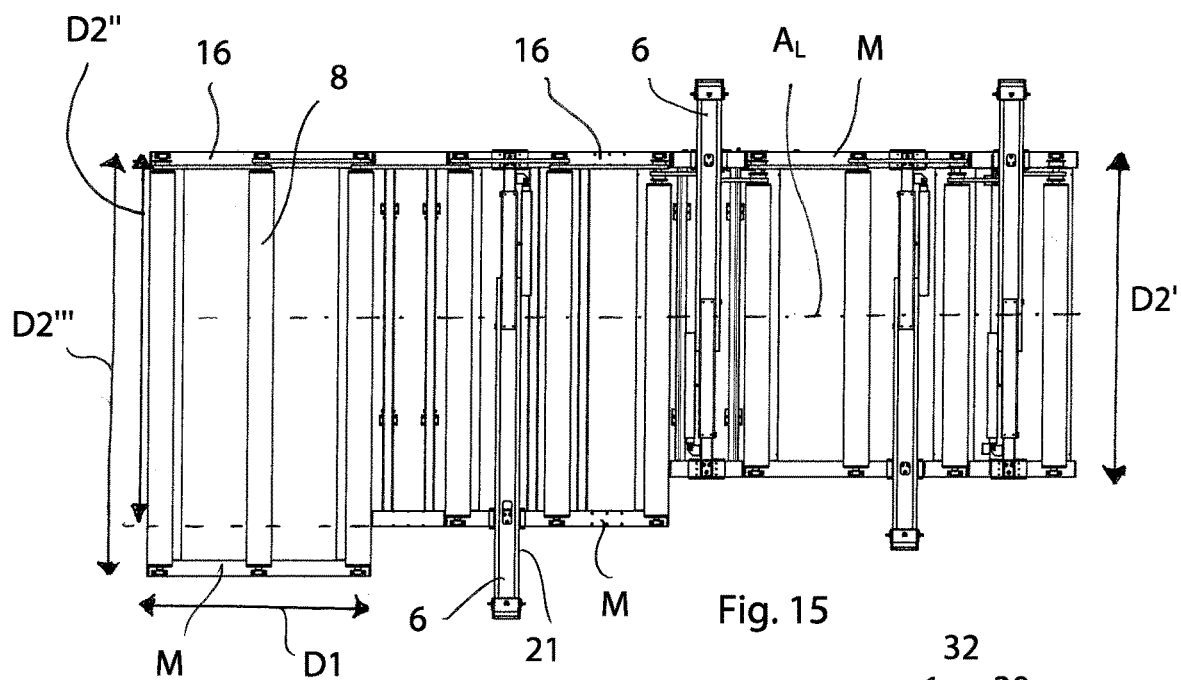
Figure 14:
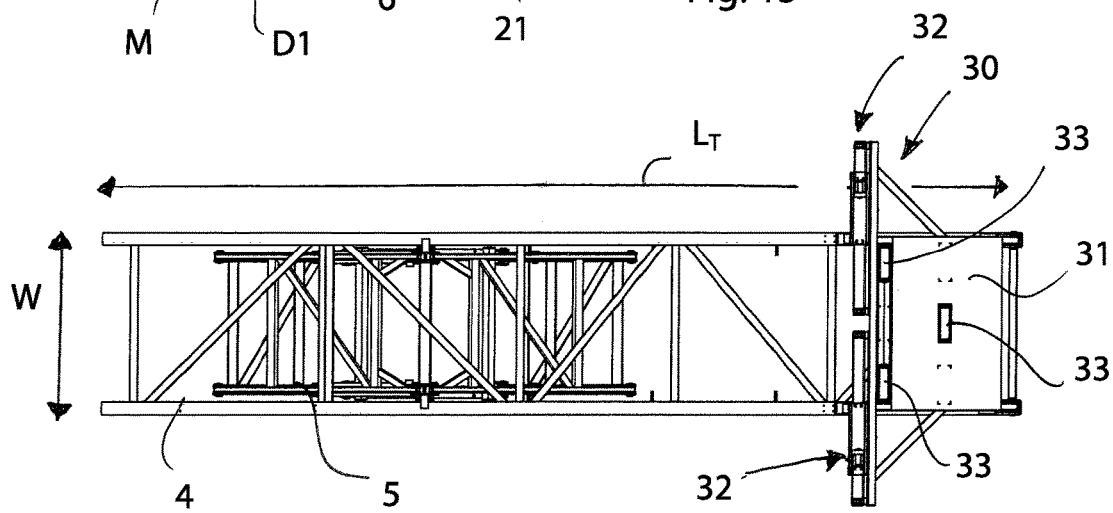
FIG. 14 is a top view of the base structural frame.

(opposite to the area of insertion of the metal sheet 2) of the bending machine 3 (FIG. 3), until it reaches and slightly presses the front portion of sheet to cause its bending, as soon as this will advance.

The operator may decide to set this advancement distance at will or through the aid of the sensors 36 detecting position and distance measurers, is continuously monitored the advancement of the lateral curve inner edge; as soon as it is detected that such lateral curved inner edge is approaching too close to boundary region of ends of the rollers 15 of the bending machine (with the risk of collision with the structure of the calender 3), the control unit $U_C$ stops the rotation of the rollers 15 of the bending machine 3 and of the rollers 8 of the plane P of support.

If necessary, is loosened the pressure of the rollers 15 of the bending machine 3 on the sheet 2 which is then released and free to be able to be rotated by the pushing members 6 and in those cases in which it is necessary, not before having detached the sheet 2 from the resting rollers 8 by the lifting assembly 10 in order to prevent the relative sliding with sliding friction.

The control unit $U_C$ by means of a comparison of the signals of the sensors 36 position detectors and distance measurers with reference data programmed and saved in memory, sends appropriate commands to pushing members 6 which come into contact with the edge/s of the metal sheet 2 and the once again displace until it is brought again into the ideal position with the generatrix in that moment close to the rollers 15 of the bending machine 3 perfectly parallel to the axis of the rollers 15 so as to rotate the sheet 2 in the correct position.

In this way, the generatrix of the metal sheet 2 close to the rollers 15 of the bending machine is arranged coaxially to the axis of the rollers 15 in the same manner previously followed for the initial step of alignment/squaring of sheet 2. In substance, the sheet is subjected to a small rotation, without translation, while the rollers 15 of the bending machine 3 are stationary.

Once this operation is finished, the control unit $U_C$ returns the pushing members 6 in the position of "parking", distant from the rollers 8 of the support plane P, to leave totally free movement of advancement of the sheet metal 2, while the rollers 15 of the bending, machine 3 in the manner synchronized, are reported in gripping position of the sheet 2.

The control unit $U_C$ then restarts the rotation of the rollers 8 of the support plane P, determining the advancement of a subsequent section of metal sheet 2 in the bending machine 3.

The above described steps are repeated for a number of times required to feed the whole sheet 2 in the bending machine 3.

To form the truncated cone structure automatically the pushing members 6 repeatedly intervene to rotate slightly from time to time the sheet metal in the form of circular crown portion, that is to say exert subsequent and repeated thrust actions on the edges E longitudinal (bent) of the sheet metal 2, arranging it several times along the whole extension thereof. The repeated and well calibrated thrust actions report from time to time the different generatrices in a position coaxial to the axis of the rollers of the calender 15, so as to keep the coherence with the desired geometry of the frustum of the cone.

Figure 34:
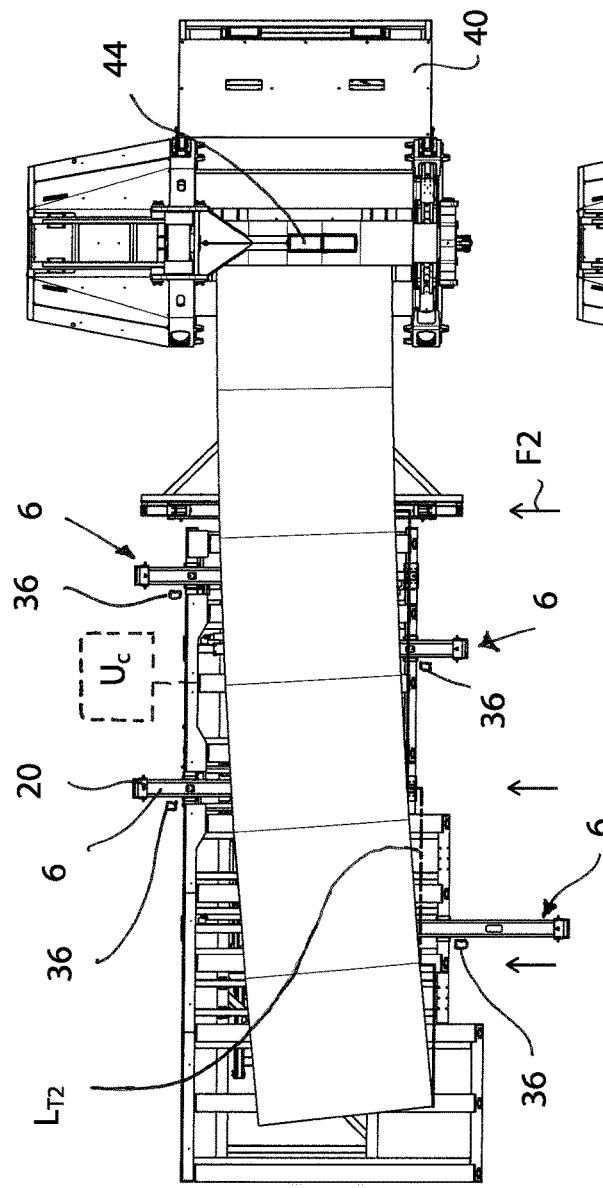
FIGS. 34 and 35 are top views which show the operation of the apparatus with two sheets of different geometry, corresponding to two different angles of conicity of the truncated cone structures to produce.
Figure 35:
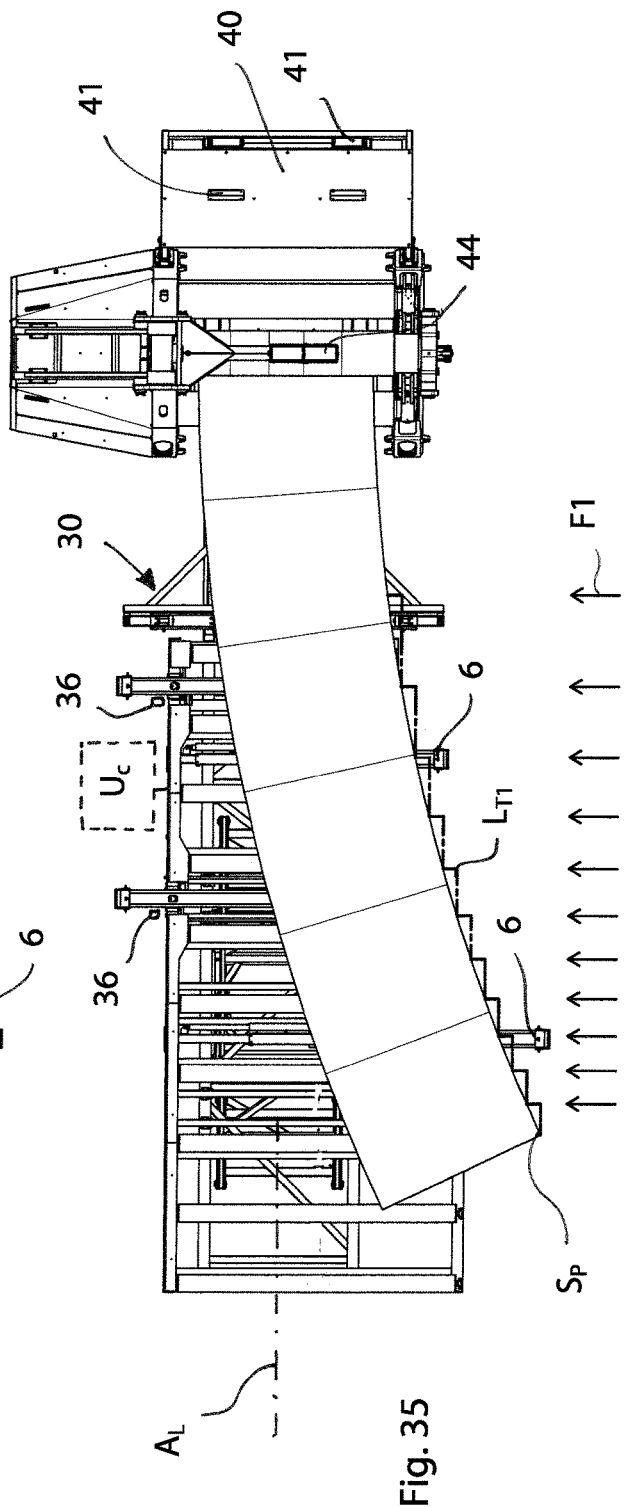

In FIGS. 34 and 35 is shown the operation with two different examples of geometry of the sheet metal, respectively meant to form a truncated cone structure with a small angle of conicity (FIG. 34), and of a truncated cone structure with a large angle of conicity (FIG. 35).

In the case of FIG. 35, the metal sheets requires a greater number of interventions of repositioning (symbolically represented by arrows F1) carried out by the pushing members 6: the dashed line the $L_{T1}$ represents the path followed by the rear edge Sp (placed lower than in the Figures). In FIG. 35 it can be noted that the dashed line LTI comprises of the horizontal portions separated by respective vertical portions: each horizontal tract symbolizes a respective linear advancement portion of the metal sheet 2 along the support plane P, and thus parallel to the longitudinal axis $A_L$ of the support structural frame 4, while each vertical portion in figure represents a movement of the edge Sp in a direction transverse to the longitudinal axis of the support structural frame 4.

In the case of FIG. 34 is evident the smaller number of interventions of repositioning (symbolically represented by arrows F2) that the pushing members 6 are called to carry out due to the smaller angle of conicity which characterizes the truncated cone structure to produce. Consequently, the respective dashed line $L_{T2}$ has horizontal portions longer, separated by a smaller number of vertical portions.

The just described sequence of repeated repositioning may take place according to two possible modes: a preset mode, i.e. programmed beforehand in the control unit $U_C$, or in a completely automatic way, that is to say entrusting to distance measurement sensors communicating with the control unit $U_C$ the task of monitoring continuously in real time the position of the edge of the sheet metal 2 during the advancement by activating from time to time the actions of repositioning of the metal sheet 2.

Both in a mode to the other, the bending process takes place with total safety for the operators, without the possibility of mistakes and with processing times considerably reduced if compared to the traditional systems of manual type based on an approach of estimation and approximation entrusted to the experience of the operators.

As the sheet 2 passes through the bending machine 3, a always greater fraction of it is then curved. A suitable support 40 with rollers 41, (belonging to the bending machine 3 is to this pivotally connected downstream of the rollers 15 of calendering) is operated to help the bent part B of the metal sheet to follow the trajectory upward.

A further aid for maintaining in position the bent part B of metal sheet is provided by a horizontal arm 43 which is mounted in a cantilevered on and slides vertically along a vertical guiding upright 42 and is provided with rollers 44 able to resting receive the inner surface the higher part of bent part B of the sheet.

When a relevant fraction of the metal sheet 2 has been bent, the aligner device 30 intervenes which restores the perfect circularity of bent part B, prevents any risk of collapse by gravity and remedies to possible misalignments of the front and rear edges $E_F$ and $E_R$ of the metal sheet 2 which are thus caused to match to one another as previously illustrated.

At this point one operator can perform the point welding ("tack welding") to stiffen the structure before the extraction from the bending machine 3.

It is evident that the perfect circular configuration thus made saves the operators many difficulties in subsequent assembly, when it is necessary welded one above the other the variants truncated cone parts obtained to construct the wind tower. In fact, if occur during assembly a vertical misalignment (i.e. a region of step in the coupling interface of the two edges, with the centers of the two circumferences of the two respective bases of the truncated cone not aligned) would make the welding of the subsequent truncated cone extremely difficult, forcing long complicated and unproductive correction actions with a consequent loss of time and losses of productivity, unacceptable in a sector extremely competitive as to wind sector.

Thanks to the efficiency of the control unit Uc and of the software with which it is loaded, and thanks to the efficiency of the pushing members 6 of aligner device 30 and other parts of the apparatus 1 is a bending process optimized, free of risks of error and totally safe for operators. The excellent results in terms of uniformity of the diameters of curvature in a single step in a bending machine 3, therefore in a single direction of passage, always makes superfluous a step of "gauging" (also known as "re-rolling") of truncated cone structure obtained.

The apparatus 1 thus allows a intensive production and efficient with a degree of repeatability on dimensional and geometric characteristics of the curved structures that are obtained that may be difficulty achieved by the current systems of curvature.

From what has been said and shown in the attached drawings, it is evident that what is provided is a method and an apparatus 1 by means of which are possible to provide in a single unidirectional passage in a bending machine 3 a truncated cone structure, with a great speeding up of the bending cycle, then reduction of dead times and in conditions of total security for the operators.

Finally the apparatus 1 makes it possible to avoid to subject the sheet 2 to undue stresses and deformations and to achieve a considerable improvement in the geometric precision and uniformity of the structures obtained, thereby facilitating the subsequent processing of the truncated cone structures and reducing in general the possibility of error and working inaccuracies.

Moreover, the modular nature or modularity of plane P of support and advancement on the basis of the dimensions and shapes of the metal sheets from time to time processable, ensures an effective action of support distributed and uniform over the entire area of the sheet metal, regardless of the shape and size of the latter. Therefore a technical solution is extremely versatile that also facilitates the shift operation or transport of the apparatus 1.

It is also understood that what has been said and shown in the attached drawings has been given purely in order to illustrate the general features and the method, as well as of a preferential form of embodiment of the apparatus 1 according to the present invention.

Other modifications or variations may be made to the entire apparatus 1, or its parts, and to the respective operating method, without thereby deviating from the claims.

The invention claimed is:

1. Apparatus for the support and controlled advancement of a metal sheet in a bending machine for forming a cylindrical or conical structure, in particular a truncated cone structure, said apparatus comprising:
a base structural frame suitable for being positioned upstream of said bending machine, with respect to an advancement direction of the metal sheet,
a plurality of conveying modules configured for being fitted, removably, to said structural frame so as to generate a modular support and advancement plane that is geometrically configurable in function of the shape and dimensions of the metal sheet to be processed,
said modular support and advancement plane being geometrically configured for maintaining in a flat condition the part of the metal sheet supported thereby,
a lifting and tilting device configured for varying the position of said structural frame, supporting said plurality of conveying modules, from a horizontal lying position to a tilted lying position in which said support and advancement plane tilted in a descending manner towards said bending machine and maintains in a flat condition the part of metal sheet supported thereby;
repositioning and position correcting members configured for orienting and arranging in a correct position said metal sheet before the start of a bending cycle and configured for correcting, in the course of the bending cycle, the position of said metal sheet, by successive repeated repositioning, to impose on the latter a preset advancement trajectory towards and through said bending machine and reposition said metal sheet, several times through the cycle to maintain the geometry thereof correct.

2. Apparatus according to claim 1, wherein said base structural frame comprises a front end that is suitable for being connected rotatably, by a connection with hinge arms, to a base of said bending machine, to a zone placed below rollers of said bending machine, in which said connection with hinge arms acts as a fulcrum such that the lying position adopted by said support and advancement plane is tangential to a deformation curve of the metal sheet at a clamping zone between upper and lower pinching rollers of said bending machine.

3. Apparatus according to claim 1, wherein said modular support and advancement plane is of the roller type, in which said conveying modules comprise respective groups of rollers arranged, during operation, with rotation axes thereof transverse to the advancement direction of the metal sheet, said groups of rollers being motor-driven and drivable in a mutually synchronous manner.

4. Apparatus according to claim 1, wherein said base structural frame extends longitudinally with a total length and extends transversely, with respect to the advancement direction of the metal sheet, with a width, and in which each conveying module has a first dimension, considered orthogonally with respect to axes of respective rollers, which is about equal to, or less than, said width of said base structural frame, each conveying module having a second dimension, considered in a direction that is orthogonal to the first dimension, that is roughly the same as or greater than said width of said base structural frame.

5. Apparatus according to claim 4, wherein one or more conveying modules have a second dimension having a same value about the same as said width, and at least one further conveying module having the second dimension thereof is greater than said width.

6. Apparatus according to claim 5, in which said conveying modules have respective second dimensions having values that are higher, the greater the distance thereof is from said bending machine, such that said modular support and advancement plane defined by said conveying modules extends with a resting area for the metal sheet that grows progressively in zones further upstream of said bending machine to be able to support metal sheets that are very extensive and/or shaped in the form of a circular crown portion also with accentuated cone opening angles of the truncated cone structure to be obtained.

7. Apparatus according to claim 1, further comprising a lifting unit configured for lifting, and maintaining said metal sheet in a position detached from said modular support and advancement plane to enable said repositioning and position correcting members to move said metal sheet without there being relative sliding with said modular support and advancement plane.

8. Apparatus according to claim 7, wherein said lining unit comprises rack units defined by bar elements on which rolling elements are provided, of the wheel or sphere type, intended for coming into contact with, and lifting, the lower surface of said metal sheet facing downwards.

9. Apparatus according to claim 8, wherein each rack unit is movable, from a lower height, placed below the plane defined above by the conveying modules, to a height above said plane, each rack unit being vertically movable through a interspace defined between adjacent conveying modules, or between a roller and another roller of each conveying module.

10. Apparatus according to claim 1, wherein each of said repositioning and position correcting members comprises a pushing member provided with a resting head configured for abutting on, and pushing longitudinal edges of said metal sheet, said resting head being movable along a respective guiding crosspiece mounted on said modular support and advancement plane transversely to the advancement direction, there also being provided an actuating member for moving said resting head along the respective guiding crosspiece.

11. Apparatus according to claim 10, wherein said resting head is connected in an oscillating manner, with a certain degree of rotational freedom to be able to adapt to the position and tilt of a respective possibly bent longitudinal edge of metal sheet.

12. Apparatus according claim 1, further comprising an aligning device suitably for being placed upstream of said bending machine, and configured for moving a bent part of metal sheet exiting the bending machine to correct the curvature of the bent part and make a front edge of said bent part that has already traversed the bending machine match to a rear edge of the metal sheet about to enter the bending machine.

13. Apparatus according to claim 12, wherein said aligning device comprises a tilting table support that is rotatable around a rotation axis that is horizontal and transverse to said advancement direction of the metal sheet, on said tilting table support two lateral repositioning pusher arms being fitted that are movable parallel to said rotation axis to exert a pushing action on the two opposite longitudinal edges of said bent part of metal sheet to correct a possible misaligned position thereof, and in which on said rotatable tilting table support pusher rollers are fitted that are suitable for pressing on the outer surface of said bent part of a metal sheet to push the metal sheet to said bending machine.

14. Apparatus according to claim 13, wherein said pusher rollers are rotatable around respective axes arranged transversely to a longitudinal axis of said structural support frame and are supported by a bar element that can oscillate around an axis extending longitudinally to said base structural frame, such that said pusher rollers adapt to the lying of the outer surface of said bent part of metal sheet.

15. Apparatus according to claim 13, wherein from said lateral repositioning pusher arms respective pin elements project internally and horizontally on which respective wheel elements are mounted, said pin elements being movable, integrally with the respective lateral repositioning pusher arms, parallel to said horizontal rotation axis from a disengaged position outside a volume bounded by said bent part of metal sheet to an engaged position inside said volume, said wheel elements being suitable for going to rest on the inner surface of said bent part of metal sheet, in which a rotation of said tilting table support away from said bending machine with said pin elements in an engaged position is matched by a pressure action of said wheel elements on said inner surface to pull back said bent part of metal sheet in relation to said bending machine.

16. Apparatus according to claim 15, wherein at least one pusher arm of said lateral pusher arms is movable, by a hydraulic or equivalent driving device, along a direction orthogonally to the plane defined by said tilting table support, to move the respective wheel element towards/away from, said tilting table support, disaligning the wheel element from the opposite wheel element, to adapt to the geometry/lying of the surface of said truncated cone bent part of said metal sheet.

17. Apparatus according to claim 15, wherein said pusher rollers are rotatable around respective axes arranged transversely to a longitudinal axis of said structural support frame and are supported by a bar element that can oscillate around an axis extending longitudinally to said base structural frame, such that said pusher rollers adapt to the lying of the outer surface of said bent part of the metal sheet, and wherein also said lateral repositioning pusher arms are supported in such a manner as to be able to oscillate around said oscillating axis to adapt to the geometry/lying of the surface of said bent part of the metal sheet.

18. Apparatus according to claim 1, comprising position detecting sensors and distance measurers associated with said repositioning and position correcting members and arranged for detecting and monitoring the position of the longitudinal edges of said metal sheet during advancement, a control unit being also provided that is configured and programmed for:
    controlling a drive of said conveying modules and activating said lifting unit on the basis of signals of said position detecting sensors and distance measurers, and
    driving selectively and mutually independently said repositioning and position correcting members on the basis of the aforesaid signals of the respective position detecting sensors and distance measurers associated therewith.

19. Apparatus according to claim 18, wherein an aligning device comprises a tilting table support that is rotatable around a rotation axis that is horizontal and transverse to said advancement direction of the metal sheet, on said tilting table support two lateral repositioning pusher arms being fitted that are movable parallel to said rotation axis to exert a pushing action on the two opposite longitudinal edges of said bent part of metal sheet to correct a possible misaligned position thereof, and in which on said rotatable tilting table support pusher rollers are fitted that are suitable for pressing on the outer surface of said bent part of a metal sheet to push the metal sheet to said bending machine, and wherein said control unit is operationally connectable to said bending machine to control the drive of the rollers of said bending machine in a reciprocally correlated manner to:
    said conveying modules,
    said lifting unit,
    said repositioning and position correcting members,
    said aligning device.

20. Apparatus according to claim 18, comprising further distance measuring sensors to detect the position of the edges of the bent part of metal sheet, said control unit being configured and programmed for activating and controlling said aligning device on the basis of the signals supplied by said further distance measuring sensors.

21. Apparatus according to claim 1, further comprising a control panel with a graphic interface for programming said control unit and for entering dimensional and geometric data relating to said metal sheet and/or to the conical or cylindrical or truncated cone structure to be obtained by bending said metal sheet.

22. Method for supporting and advancing in a controlled manner a metal sheet towards and through a bending machine for forming a cylindrical or conical structure, in particular a truncated cone structure, comprising the steps of:
- arranging a plurality of conveying modules so as to generate a modular support and advancement plane adapted to the shape and dimensions of said metal sheet to be processed,
- placing on said modular support and advancement plane said metal sheet,
- driving repositioning and position correcting members acting on edges of said metal sheet for orienting and arranging said metal sheet in a correct position before the start of a bending cycle,
- driving a lifting and tilting device for arranging said support and advancement plane in a tilted lying position in a descending manner to said bending machine, whilst said metal sheet is maintained in a flat configuration,
- advancing said metal sheet by a portion through said bending machine to bend a front portion of said metal sheet,
- returning said support and advancement plane, and thus the part of the metal sheet supported thereby, to a horizontal lying position,
- resuming the advancement of said metal sheet through said bending machine and
- further driving said repositioning and position correcting members for correcting, during the bending cycle, the position of said metal sheet and imposing on said metal sheet a preset advancement trajectory through said bending machine.

23. Method according to claim 22, wherein after returning said support and advancement plane, and thus the part of metal sheet supported thereby, to a horizontal lying position and before resuming the advancement of said metal sheet through said bending machine, a rear roller of said bending machine is lifted that is opposite an insertion zone for inserting said metal sheet, so that it reaches and presses lightly, against the front portion of said metal sheet to cause the bending thereof as soon as the advancement of said metal sheet resumes.

24. Method according to claim 22, wherein, by position detecting sensors and distance measurers, the position of the edges of said metal sheet is also progressively detected during advancement by steps of said metal sheet and the advancement thereof is interrupted periodically to reposition and align correctly the metal sheet on the basis of a comparison of position signals supplied by said position detecting sensors and distance measurers with data relating to said preset advancement trajectory of said metal sheet.

25. Method according to claim 22, wherein before driving said repositioning and position correcting members, said metal sheet is lifted to remove the metal sheet from, and avoid relative sliding with, said modular support and advancement plane to prevent possible damage to a lower surface of said metal sheet.

26. Method according to claim 22, wherein the bent part of a metal sheet exiting the bending machine is moved transversely by an aligning device for correcting curvature of said bent part and making a front edge of said bent part match to a rear edge of the metal sheet that is about to enter the bending machine so as to restore a perfect circularity of the already bent metal sheet part and avoid the risk of the metal sheet collapsing through the force of gravity.

27. Method according to claim 26, wherein said conveying modules, said lifting unit, said repositioning and position correcting members, said aligning device, and the rollers of said bending machine are synchronized with each other.

* * * * *